US011436932B2

(12) United States Patent
Robinson et al.

(10) Patent No.: US 11,436,932 B2
(45) Date of Patent: Sep. 6, 2022

(54) METHODS AND SYSTEMS TO ALLOW REAL PILOTS IN REAL AIRCRAFT USING AUGMENTED AND VIRTUAL REALITY TO MEET IN A VIRTUAL PIECE OF AIRSPACE

(71) Applicant: RED SIX AEROSPACE INC., Santa Monica, CA (US)

(72) Inventors: Daniel Augustine Robinson, Marina Del Rey, CA (US); Nikola Vladimir Bicanic, Venice, CA (US); Glenn Thomas Snyder, Venice, CA (US)

(73) Assignee: RED SIX AEROSPACE INC., Santa Monica, CA (US)

( * ) Notice: Subject to any disclaimer, the term of this patent is extended or adjusted under 35 U.S.C. 154(b) by 198 days.

(21) Appl. No.: 16/281,499

(22) Filed: Feb. 21, 2019

(65) Prior Publication Data

US 2019/0333396 A1    Oct. 31, 2019

Related U.S. Application Data

(60) Provisional application No. 62/663,883, filed on Apr. 27, 2018, provisional application No. 62/690,363, filed on Jun. 27, 2018.

(51) Int. Cl.
*G08G 5/02* (2006.01)
*G02B 27/01* (2006.01)
(Continued)

(52) U.S. Cl.
CPC .......... *G08G 5/025* (2013.01); *G02B 27/017* (2013.01); *G06T 19/006* (2013.01); *H04W 4/02* (2013.01)

(58) Field of Classification Search
CPC .... G08G 5/025; G02B 27/017; G06T 19/006; H04W 4/02
See application file for complete search history.

(56) References Cited

U.S. PATENT DOCUMENTS

| 5,838,262 A | 11/1998 | Kershner |
| 6,826,458 B2 | 11/2004 | Horvath |

(Continued)

OTHER PUBLICATIONS

Collin Krum, Ordinary Pilots Are Closer to Getting Fighter Jet-Like Augmented Reality Displays, Aug. 31, 2015, Jalopnik (https://jalopnik.com/general-aviation-pilots-closer-to-getting-fighter-jet-I-1722914390).

(Continued)

*Primary Examiner* — Frederick M Brushaber
*Assistant Examiner* — Elizabeth Yang
(74) *Attorney, Agent, or Firm* — FisherBroyles LLP

(57) ABSTRACT

Disclosed herein is a system for facilitating real pilots in real aircraft using augmented and virtual reality to meet in a virtual piece of airspace, in accordance with some embodiments. Accordingly, the system may include a communication device configured for receiving at least one first sensor data corresponding to at least one first sensor associated with a first vehicle (and receiving at least one second sensor data corresponding to at least one second sensor associated with a second vehicle). Further, the communication device may be configured for transmitting at least one second presentation data to at least one second presentation device associated with the second vehicle. Further, the system may include a processing device configured for generating the at least one second presentation data based on the at least one first sensor data and the at least one second sensor data.

14 Claims, 16 Drawing Sheets

(51) Int. Cl.
*G06T 19/00* (2011.01)
*H04W 4/02* (2018.01)

(56) References Cited

U.S. PATENT DOCUMENTS

| | | | |
|---|---|---|---|
| 8,463,463 B1 | 6/2013 | Feldmann | |
| 9,099,009 B2 | 8/2015 | Sowadski | |
| 10,025,096 B2* | 7/2018 | Yoon | G06V 20/20 |
| 10,585,471 B2 | 3/2020 | Reichow | |
| 10,713,960 B1 | 7/2020 | Ziarnick | |
| 10,884,525 B1 | 1/2021 | Vonsik | |
| 10,977,493 B2* | 4/2021 | Speasl | H04L 9/0894 |
| 10,996,473 B2* | 5/2021 | Yang | G06T 19/006 |
| 2002/0053983 A1 | 5/2002 | Chamas | |
| 2003/0025714 A1* | 2/2003 | Ebersole | G08G 5/0091 |
| | | | 345/632 |
| 2005/0231419 A1 | 10/2005 | Mitchell | |
| 2006/0178758 A1 | 8/2006 | Koriat | |
| 2007/0005199 A1* | 1/2007 | He | G01C 23/00 |
| | | | 701/16 |
| 2008/0319647 A1 | 12/2008 | Dehn | |
| 2010/0096491 A1 | 4/2010 | Whitelaw | |
| 2010/0125412 A1 | 5/2010 | Suddreth | |
| 2010/0283635 A1* | 11/2010 | Brinkman | G08G 5/0021 |
| | | | 340/961 |
| 2011/0183301 A1 | 7/2011 | Turner | |
| 2012/0156653 A1 | 6/2012 | Wokurka | |
| 2012/0176497 A1 | 7/2012 | Shadmi | |
| 2012/0303252 A1* | 11/2012 | Schwinn | G08G 5/045 |
| | | | 701/120 |
| 2013/0038510 A1 | 2/2013 | Brin | |
| 2013/0050070 A1 | 2/2013 | Lewis | |
| 2013/0162632 A1 | 6/2013 | Varga | |
| 2013/0280678 A1 | 10/2013 | Towers | |
| 2014/0080099 A1 | 3/2014 | Sowadski | |
| 2014/0127655 A1 | 5/2014 | Taylor | |
| 2014/0306866 A1 | 10/2014 | Miller | |
| 2015/0187224 A1 | 7/2015 | Moncrief | |
| 2015/0234455 A1 | 8/2015 | Lavalle | |
| 2015/0294505 A1 | 10/2015 | Atsmon | |
| 2016/0019808 A1 | 1/2016 | Chavez et al. | |
| 2016/0027336 A1 | 1/2016 | Towers | |
| 2016/0165409 A1 | 6/2016 | Bulut | |
| 2016/0195923 A1 | 7/2016 | Nauseef | |
| 2017/0030735 A1 | 2/2017 | Mohideen | |
| 2017/0109562 A1 | 4/2017 | Shroff | |
| 2017/0139205 A1 | 5/2017 | Lee | |
| 2017/0186240 A1 | 6/2017 | Alaniz | |
| 2017/0262052 A1 | 9/2017 | Richmond | |
| 2017/0308157 A1 | 10/2017 | Tsuda | |
| 2018/0096532 A1 | 4/2018 | Srivastav | |
| 2018/0130260 A1 | 5/2018 | Schmirler | |
| 2018/0155052 A1 | 6/2018 | Lacroix | |
| 2018/0190095 A1 | 7/2018 | Leegate | |
| 2018/0253856 A1 | 9/2018 | Price | |
| 2018/0272231 A1 | 9/2018 | Katoh | |
| 2019/0035258 A1 | 1/2019 | Zhang | |
| 2019/0212158 A1 | 7/2019 | Gordon | |
| 2019/0215671 A1 | 7/2019 | Takii | |
| 2019/0228590 A1 | 7/2019 | Kaifosh | |
| 2019/0317718 A1 | 10/2019 | George | |
| 2020/0151958 A1* | 5/2020 | Livneh | G06T 5/008 |

OTHER PUBLICATIONS

Written Opinion of the International Searching Authority dated Dec. 17, 2021, in International Application No. PCT/US2021/057357.

International Search Report dated Dec. 17, 2021, in International Application No. PCT/US2021/057357.

Michael William Gillen; A Study Evaluating if Targeted Training for Startle Effect can Improve Pilot Reactions in Handling U Unexpected Situations in a Flight Simulator; The University of North Dakota. ProQuest Dissertations Publishing, Jan. 12, 2016 (Year: 2016).

* cited by examiner

METHODS AND SYSTEMS TO ALLOW REAL PILOTS IN REAL AIRCRAFT USING AUGMENTED AND VIRTUAL REALITY TO MEET IN A VIRTUAL PIECE OF AIRSPACE

CROSS-REFERENCE TO RELATED APPLICATIONS

The present patent application claims the priority benefit of U.S. provisional patent application Ser. No. 62/663,883 filed Apr. 27, 2018 and Ser. No. 62/690,363 filed Jun. 27, 2018; and is related to a previously filed, now application having Ser. No. 16/243,026 filed on Jan. 8, 2019, the disclosures of which are incorporated herein by reference.

FIELD OF THE INVENTION

The present invention relates generally to the field of augmented reality. More specifically, the present invention describes methods and systems to allow real pilots in real aircraft use augmented and virtual reality for combat training.

BACKGROUND OF THE INVENTION

Technology is often used for various types of training. This may include simulators. For combat training, pilots are provided with simulators that simulate the real aircraft. NATO has developed LVC (Live, Virtual, Constructive) model as the next generation of hybrid training solutions to prepare military for the battlefield of the future. Live refers to real people in real ops systems. Virtual refers to real people in simulated systems, on the ground. Further, constructive refers to computer-generated targets.

However, the existing systems allow pilots to physically only see live assets. There are no visuals for constructive and virtual assets. Therefore, the existing systems provide very limited training value.

Further, the existing systems do not allow pilots to look out of cockpit window and see a real-looking airplane in the sky. Instead, the existing systems use instruments or flight computers that may display an enemy—but it's not an enemy that the pilots can actually see. Therefore, they do not allow for within visual range manoeuvring. Further, the existing systems are unable to provide high quality visual content to pilots with high accuracy.

Moreover, conventional pilot training process involves a lot of time and resources. This includes flight training during day and night, instrument training, ground training, training geared towards passenger safety and comfort, and high altitude operations. Accordingly, pilots are highly skilled such that they can manage multiple things while flying an aircraft. For example, currently flight navigation requires the pilot to obtain and interpret data from multiple devices such as compass, GPS, various flight computers etc. The requirement of high skilled pilots limits the advent for new transport solutions like urban aviation (frequent flying into/out of densely populated environments). Accordingly, it is important to de-skill the pilot requirements and increase safety accordingly. In other words, there is a need to make pilots' job as easy and as safe as taxi drivers.

Therefore, there is a need for improved methods and systems to allow real pilots in real aircraft use augmented and virtual reality that may overcome one or more of the above-mentioned problems and/or limitations.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, an online platform to allow real pilots in real aircraft using augmented and virtual reality to meet in a virtual piece of airspace is disclosed. The online platform may include a centralized server which may communicate with augmented reality display devices for pilots, and sensor systems of aircraft. Further, the centralized server may include one or more servers; for example, a master server and one or more local servers. The one or more servers may be stationed on one or more of the aircraft, the ground and a satellite orbiting the earth. All communication between the augmented reality display device and the sensor system with the online platform may be carried via radio waves. The augmented reality display device may display content to a pilot flying the aircraft. The sensor system of the aircraft may include one or more internal sensors to track and localize the pilot's head within the cockpit of the aircraft. Further, the sensor system of the aircraft may include one or more external sensors to track the operational state (e.g. location, speed, direction of travel, etc.) of the aircraft. Further, Coupled Fusion Tracking (CFT) may be employed to combine the data received from the one or more internal sensors and the one or more external sensors to provide a highly usable augmented reality solution in a fast-moving environment.

According to some aspects, a method to allow real pilots in real aircraft using augmented and virtual reality to meet in a virtual airspace is disclosed. The method may include creating the virtual airspace in an augmented and virtual reality environment. Further, the method may include a real pilot in a real aircraft joining the virtual airspace via their augmented and virtual reality equipment. The real aircraft may be flying in the real world. Further, the method may include providing augmented and virtual reality content to the real pilot via their augmented and virtual reality equipment. Further, the method may include tracking the real pilot and the real aircraft. This may include tracking the position and orientation of the pilot's head within the cockpit of the aircraft using the one or more internal sensors. Further, this may include tracking the operational state (e.g. location, speed, direction of travel, etc.) of the aircraft in the virtual airspace using the one or more external sensors. Moreover, the method may include continuously updating the augmented and virtual reality content shown to the real pilot flying the real aircraft based on the tracking the real pilot and the real aircraft.

According to some embodiments, an airborne flight training system is disclosed. The system may be referred to as Airborne Tactical Augmented Reality Integration (ATARI). The system may allow real pilots in real aircraft using augmented and virtual reality to meet in a virtual piece of airspace and conduct live flight and combat training in either an augmented or virtual space. Further, the system may be configured to accurately display a high fidelity image to pilots in flight using an augmented reality device (such as a flight helmet, or a special goggle or the cockpit glass). Further, the system may use external trackers (for outside-in tracking) inside the cockpit to localise the pilot's head within the airframe. Further, the system may use external sensors in the aircraft itself to track the aircraft. Further, the system may use Coupled Fusion Tracking (CFT) to combine two pieces of information including the state of the pilot's head and the aircraft to provide highly usable augmented reality solution in a fast-moving environment.

According to some embodiments, a method and a system is disclosed for monitoring operational state (e.g. location, speed, direction of travel, etc.) of a first vehicle and accordingly providing an image of the first vehicle in an augmented reality view visible from within a second vehicle (physically distant from the first vehicle) in order to create an impression of the first vehicle being in the vicinity of the second vehicle. Further, the method and system may provide an augmented reality view to a user of a vehicle (E.g. aircraft) in order to facilitate training for combat. Accordingly, the method and system may provide a multi-player video game where participants play the video game while flying real aircraft in the real world.

In further embodiments, the system may support all domains including, Sea, Air, Land, Space and Cyber, and may also include all vehicles (other than aircraft). Further, the system may support various types of training (other than combat training).

Disclosed herein is a method of facilitating real pilots in real aircraft use augmented and virtual reality for combat training, in accordance with some embodiments. Accordingly, the method may include a step of receiving, using a communication device, at least one first sensor data corresponding to at least one first sensor associated with a first vehicle. Further, the method may include a step of receiving, using the communication device, at least one second sensor data corresponding to at least one second sensor associated with a second vehicle. Further, the method may include a step of transmitting, using the communication device, at least one second presentation data to at least one second presentation device associated with the second vehicle. Further, the method may include a step of generating, using a processing device, the at least one second presentation data based on the at least one first sensor data and the at least one second sensor data. Further, the method may include a step of storing, using a storage device, the at least one second presentation data.

Further disclosed herein is a system for facilitating allow real pilots in real aircraft use augmented and virtual reality for combat training, in accordance with some embodiments. Accordingly, the system may include a communication device configured for receiving at least one first sensor data corresponding to at least one first sensor associated with a first vehicle. Further, the communication device may be configured for receiving at least one second sensor data corresponding to at least one second sensor associated with a second vehicle. Further, the communication device may be configured for transmitting at least one second presentation data to at least one second presentation device associated with the second vehicle. Further, the system may include a processing device configured for generating the at least one second presentation data based on the at least one first sensor data and the at least one second sensor data. Further, the system may include a storage device configured for storing the at least one second presentation data.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
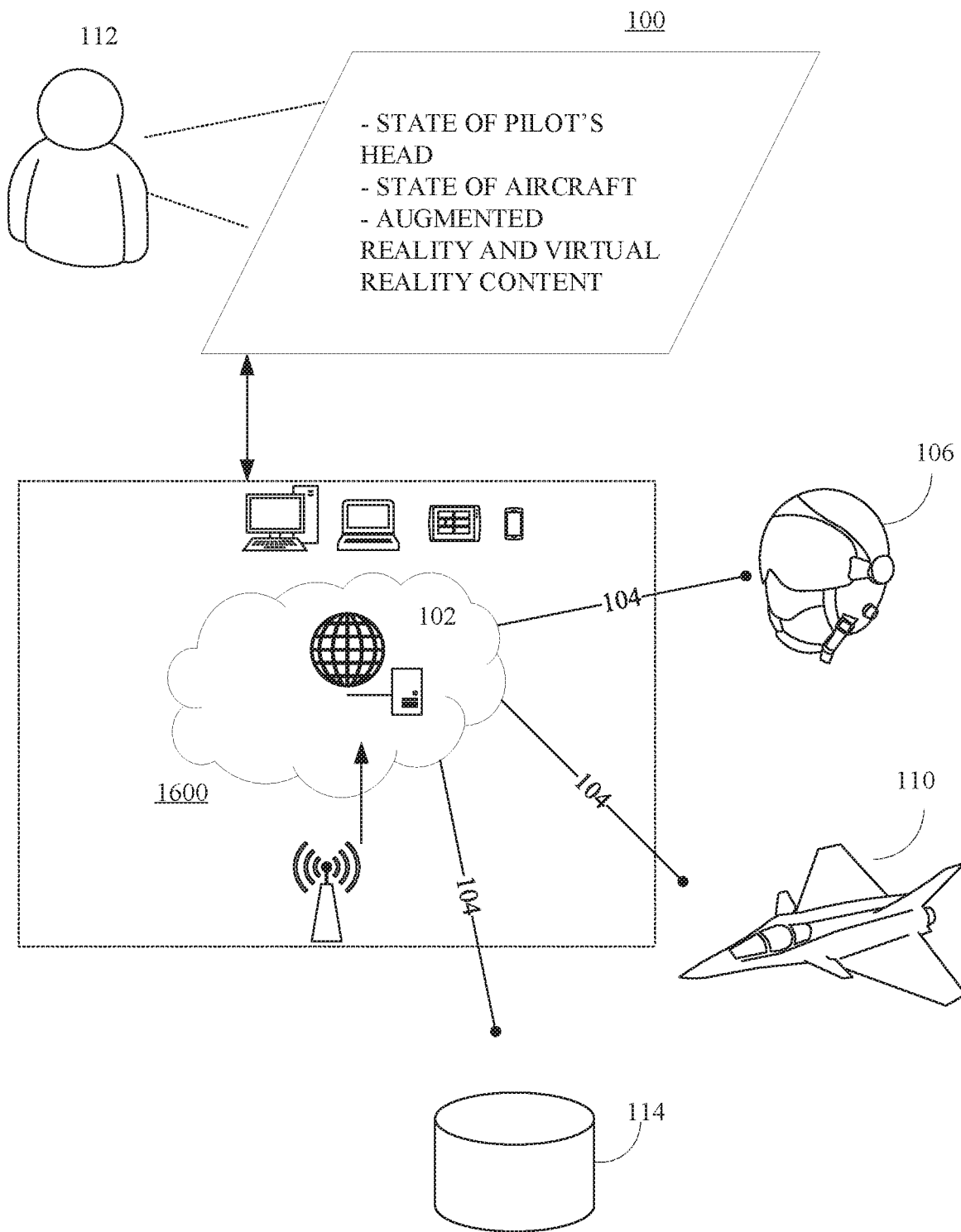
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings.

Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of augmented and virtual reality, embodiments of the present disclosure are not limited to use only in this context.

Figure 2:
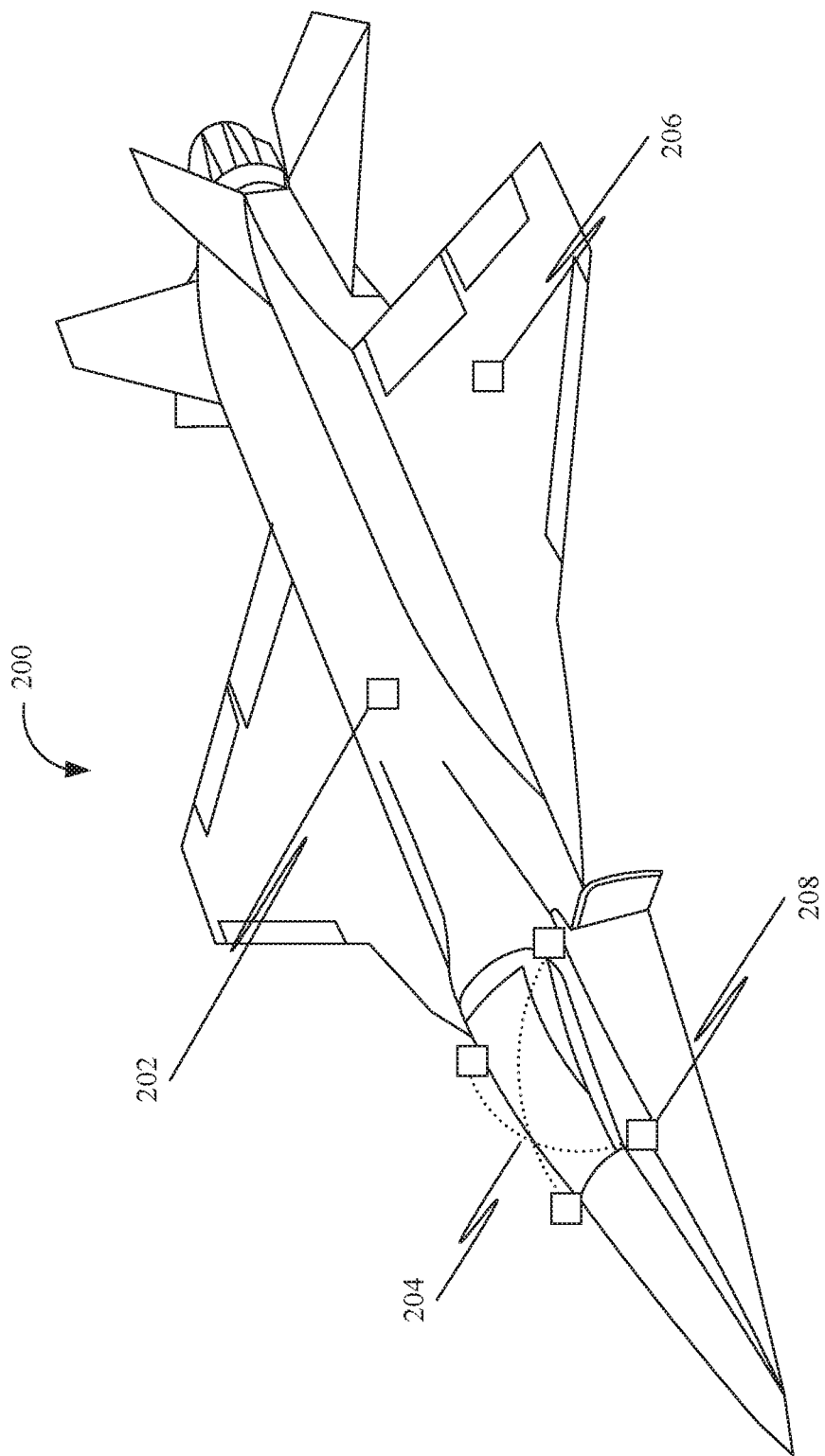
FIG. 2 shows a system to allow real pilots in real aircraft using augmented and virtual reality to meet in a virtual piece of airspace, in accordance with some embodiments.

FIG. 1 is an illustration of an online platform 100 consistent with various embodiments of the present disclosure. By way of non-limiting example, the online platform 100 to allow real pilots in real aircraft using augmented and virtual reality to meet in a virtual piece of airspace may be hosted on a centralized server 102, such as, for example, a cloud computing service. The centralized server 102 may communicate with other network entities, such as, for example, an augmented and virtual reality display device 106, a sensor system 110 of an aircraft (such as an aircraft 200, as shown in FIG. 2), database 114 (such as, 3D model database), over a communication network 104, such as, but not limited to, the Internet. Accordingly, in some instances, the augmented and virtual reality display device 106 operated by a pilot (a user 112) may be in communication with the online platform 100. Further, the sensor system 110 of the aircraft 200 may be in communication with the online platform 100. All communication between the augmented and virtual reality display device 106 and the sensor system 110 with the online platform 100 may be carried via radio waves. For example, Aircraft Communications Addressing and Reporting System (ACARS) may be used for communication between the augmented and virtual reality display device 106 or the sensor system 110, and the online platform 100.

Further, the centralized server 102 may include one or more servers; for example, a master server and one or more local servers. The one or more servers may be stationed on one or more of the aircraft, the ground and a satellite orbiting the earth (such as Satcom and Iridium satellites). Further, as shown in FIG. 2, the aircraft 200 may include a Remote Artificial Intelligence Link (RAIL) 202 for communication with the centralized server 102. Further, the AI-driven processing and the graphics generation may be performed on the centralized server 102.

The augmented and virtual reality display device 106 may display content to a pilot flying the aircraft 200. The augmented and virtual reality display device 106 may be one of a head-mounted display (HMD), Eyeglasses, head-up display (HUD), smart contact lenses, Virtual retinal display, EyeTap, and cockpit glass. In some embodiments, the augmented and virtual reality display device 106 may be integrated with a flight helmet of a pilot. As shown in FIG. 2, an Enhanced Visual Environment (EVE) 204 may be configured to provide high fidelity/wide field of view content to the augmented and virtual reality display device 106.

The sensor system 110 of the aircraft 200 may include one or more internal sensors to track and localize the pilot's head within the cockpit of the aircraft 200. Further, the sensor system 110 of the aircraft 200 may include one or more external sensors to track the position and orientation of the aircraft 200. As shown in FIG. 2, an Avionics Integration System (AIS) 206 may be configured to provide accurate six degrees of freedom positioning of aircraft 200. The six degrees of freedom include longitudinal (forward and backward thrust), vertical (aircraft moves upward and downward), lateral (aircraft moves from side to side), pitch (nose pitches up or down), roll (wings roll up or down) and yaw (nose moves from side to side).

Further, as shown in FIG. 2, Coupled Fusion Tracking (CFT) 208 may be employed to combine the data received from the one or more internal sensors and the one or more external sensors to provide a highly usable augmented reality solution in a fast-moving environment. Further, the CFT 208 may integrate both virtual reality and augmented reality to provide robust augmented reality visuals within a dynamic environment. For example, the CFT 208 may allow for drawing an accurate picture of an enemy aircraft in augmented and virtual reality display device 106 worn by a pilot.

The user 112 may access online platform 100 through a software application or browser. The software application may be embodied as, for example, but not be limited to, a website, a web application, a desktop application, an augmented reality application, a virtual reality application and a mobile application compatible with a computing device 1600.

Figure 3:
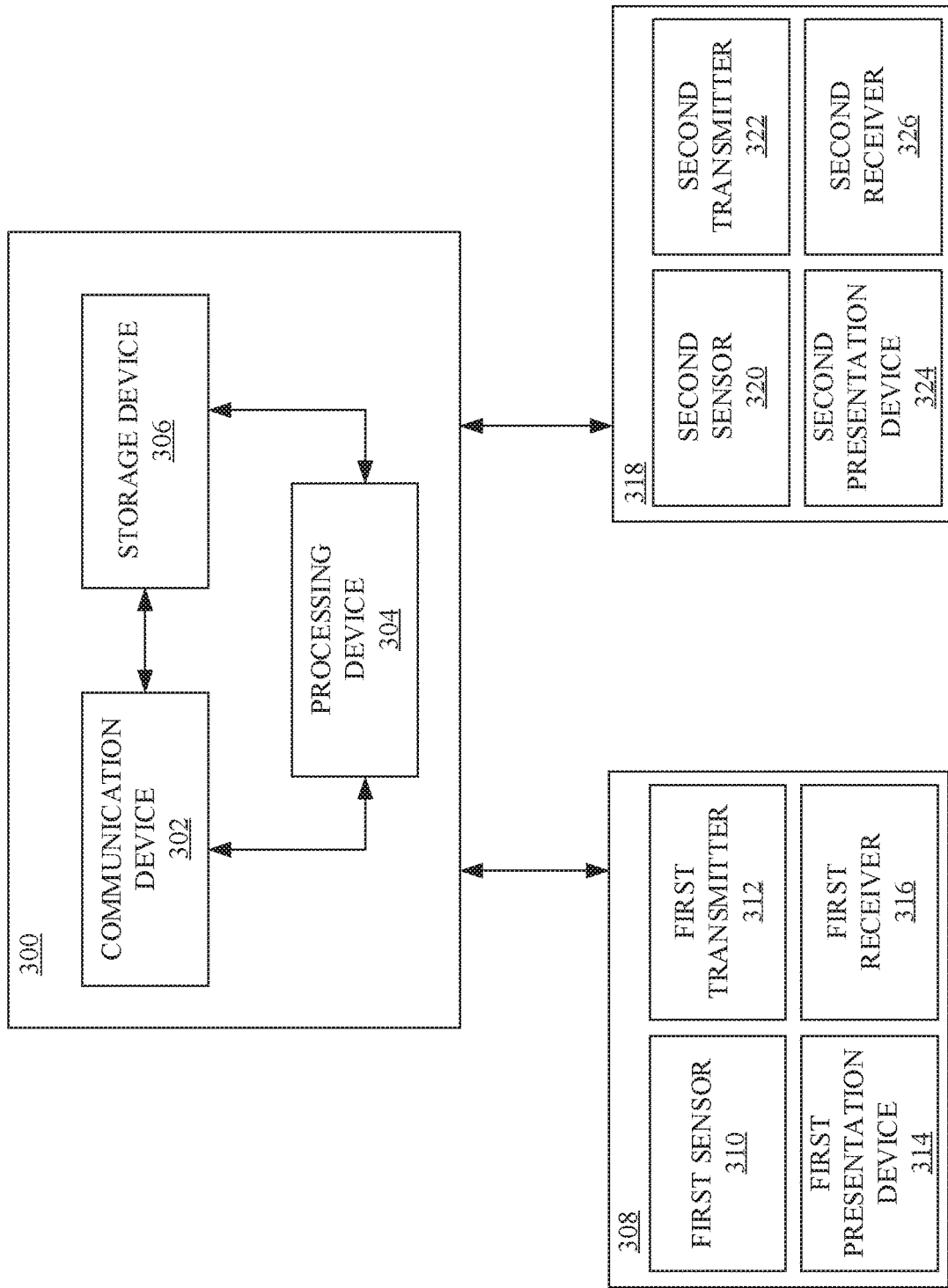
FIG. 3 is a block diagram of a system for facilitating provisioning of a virtual experience, in accordance with some embodiments.

FIG. 3 is a block diagram of a system 300 for facilitating provisioning of a virtual experience in accordance with some embodiments. The system 300 may include a communication device 302, a processing device 304 and a storage device 306.

The communication device 302 may be configured for receiving at least one first sensor data corresponding to at least one first sensor 310 associated with a first vehicle 308. Further, the at least one first sensor 310 may be communicatively coupled to a first transmitter 312 configured for transmitting the at least one first sensor data over a first communication channel. In some embodiments, the first vehicle 308 may be a first aircraft. Further, a first user may be a first pilot.

Further, the communication device 302 may be configured for receiving at least one second sensor data corresponding to at least one second sensor 320 associated with a second vehicle 318. Further, the at least one second sensor 320 may be communicatively coupled to a second transmitter 322 configured for transmitting the at least one second sensor data over a second communication channel. In some embodiments, the second vehicle 318 may be a second aircraft. Further, a second user may be a second pilot.

In some embodiments, the at least one first sensor data may be received from a first On-Board-Diagnostics (OBD) system of the first vehicle 308, the at least one second sensor data may be received from a second On-Board-Diagnostics (OBD) system of the second vehicle 318.

Further, the communication device 302 may be configured for transmitting at least one first presentation data to at least one first presentation device 314 associated with the first vehicle 308. Further, the at least one first presentation device 314 may include a first receiver 316 configured for receiving the at least one first presentation data over the first communication channel. Further, the at least one first presentation device may be configured for presenting the at least one first presentation data.

Further, the communication device 302 may be configured for transmitting at least one second presentation data to at least one second presentation device 324 associated with the second vehicle 318. Further, the at least one second presentation device 324 may include a second receiver 326 configured for receiving the at least one second presentation data over the second communication channel. Further, the at least one second presentation device may be configured for presenting the at least one second presentation data.

Further, the processing device 304 may be configured for generating the at least one first presentation data based on the at least one second sensor data.

Further, the processing device 304 may be configured for generating the at least one second presentation data based on the at least one first sensor data.

Further, the storage device 306 may be configured for storing each of the at least one first presentation data and the at least one second presentation data.

In some embodiments, the at least one first sensor 310 may include one or more of a first orientation sensor, a first motion sensor, a first accelerometer, a first location sensor, a first speed sensor, a first vibration sensor, a first temperature sensor, a first light sensor and a first sound sensor. Further, the at least one second sensor 320 may include one or more of a second orientation sensor, a second motion sensor, a second accelerometer, a second location sensor, a second speed sensor, a second vibration sensor, a second temperature sensor, a second light sensor and a second sound sensor.

In some embodiments, the at least one first sensor 310 may be configured for sensing at least one first physical variable associated with the first vehicle 308. Further, the at least one second sensor 320 may be configured for sensing at least one second physical variable associated with the second vehicle. In further embodiments, the at least one first physical variable may include one or more of a first orientation, a first motion, a first acceleration, a first location, a first speed, a first vibration, a first temperature, a first light intensity and a first sound. Further, the at least one second physical variable may include one or more of a second orientation, a second motion, a second acceleration, a second location, a second speed, a second vibration, a second temperature, a second light intensity and a second sound.

In some embodiments, the at least one first sensor 310 may include a first environmental sensor configured for sensing a first environmental variable associated with the first vehicle 308. Further, the at least one second sensor 320 may include a second environmental sensor configured for sensing a second environmental variable associated with the second vehicle.

In some embodiments, the at least one first sensor 310 may include a first user sensor configured for sensing a first user variable associated with a first user of the first vehicle 308. Further, the at least one second sensor 320 may include a second user sensor configured for sensing a second user variable associated with a second user of the second vehicle 318.

In further embodiments, the first user variable may include a first user location and a first user orientation. Further, the second user variable may include a second user location and a second user orientation. Further, the first presentation device may include a first head mount display. Further, the second presentation device may include a second head mount display.

In further embodiments, the first head mount display may include a first user location sensor of the at least one first sensor 310 configured for sensing the first user location and a first user orientation sensor of the at least one first sensor 310 configured for sensing the first user orientation. The first head mount display is explained in further detail in conjunction with FIG. 4 below. Further, the second head mount display may include a second user location sensor of the at least one second sensor 320 configured for sensing the second user location, a second user orientation sensor of the at least one second sensor 320 configured for sensing the second user orientation.

In further embodiments, the first vehicle 308 may include a first user location sensor of the at least one first sensor 310 configured for sensing the first user location and a first user orientation sensor of the at least one first sensor 310 configured for sensing the first user orientation. Further, the second vehicle 318 may include a second user location sensor of the at least one second sensor 320 configured for sensing the second user location, a second user orientation sensor of the at least one second sensor 320 configured for sensing the second user orientation.

In further embodiments, the first user orientation sensor may include a first gaze sensor configured for sensing a first eye gaze of the first user. Further, the second user orientation sensor may include a second gaze sensor configured for sensing a second eye gaze of the second user.

In further embodiments, the first user location sensor may include a first proximity sensor configured for sensing the first user location in relation to the at least one first presentation device 314. Further, the second user location sensor may include a second proximity sensor configured for sensing the second user location in relation to the at least one second presentation device 324.

In some embodiments, the first head mount display may include a first see-through display device. Further, the second head mount display may include a second see-through display device.

In some embodiments, the first head mount display may include a first optical marker configured to facilitate determination of one or more of the first user location and the first user orientation. Further, the at least one first sensor 310 may include a first camera configured for capturing a first image of the first optical marker. Further, the at least one first sensor 310 may be communicatively coupled to a first processor associated with the vehicle. Further, the first processor may be configured for determining one or more of the first user location and the first user orientation based on analysis of the first image. Further, the second head mount display may include a second optical marker configured to facilitate determination of one or more of the second user location and the second user orientation. Further, the at least one second sensor 320 may include a second camera configured for capturing a second image of the second optical marker. Further, the at least one second sensor 320 may be communicatively coupled to a second processor associated with the vehicle. Further, the second processor may be configured for determining one or more of the second user location and the second user orientation based on analysis of the second image.

In some embodiments, the first presentation device may include a first see-through display device disposed in a first windshield of the first vehicle 308. Further, the second presentation device may include a second see-through display device disposed in a second windshield of the second vehicle 318.

In some embodiments, the first vehicle 308 may include a first watercraft, a first land vehicle, a first aircraft and a first amphibious vehicle. Further, the second vehicle 318 may include a second watercraft, a second land vehicle, a second aircraft and a second amphibious vehicle.

In some embodiments, the at least one first presentation data may include one or more of a first visual data, a first audio data and a first haptic data. Further, the at least one second presentation data may include one or more of a second visual data, a second audio data and a second haptic data.

In some embodiments, the at least one first presentation device 314 may include at least one environmental variable actuator configured for controlling at least one first environmental variable associated with the first vehicle 308 based on the first presentation data. Further, the at least one second presentation device 324 may include at least one environmental variable actuator configured for controlling at least one second environmental variable associated with the second vehicle 318 based on the second presentation data. In further embodiments, the at least one first environmental variable may include one or more of a first temperature level, a first humidity level, a first pressure level, a first oxygen level, a first ambient light, a first ambient sound, a first vibration level, a first turbulence, a first motion, a first speed, a first orientation and a first acceleration, the at least one second environmental variable may include one or more of a second temperature level, a second humidity level, a second pressure level, a second oxygen level, a second ambient light, a second ambient sound, a second vibration level, a second turbulence, a second motion, a second speed, a second orientation and a second acceleration.

In some embodiments, the first vehicle 308 may include each of the at least one first sensor 310 and the at least one first presentation device 314. Further, the second vehicle 318 may include each of the at least one second sensor 320 and the at least one second presentation device 324.

In some embodiments, the storage device 306 may be further configured for storing a first three-dimensional model corresponding to the first vehicle 308 and a second three-dimensional model corresponding to the second vehicle 318. Further, the generating of the first presentation data may be based on the second three-dimensional model. Further, the generating of the second presentation data may be based on the first three-dimensional model.

In some embodiments, the communication device 302 may be further configured for receiving an administrator command from an administrator device. Further, the generating of one or more of the first presentation data and the second presentation data may be based on the administrator command. In further embodiments, the at least one first presentation data may include at least one first virtual object model corresponding to at least one first virtual object. Further, the at least one second presentation data may include at least one second virtual object model corresponding to at least one second virtual object. Further, the generating of the at least one first virtual object model may be independent of the at least one second sensor model. Further, the generating of the at least one second virtual object model may be independent of the at least one first sensor model. Further, the generating of one or more of the at least one first virtual object model and the at least one second virtual object model may be based on the administrator command. Further, the storage device 306 may be configured for storing the at least one first virtual object model and the at least one second virtual object model.

In further embodiments, the administrator command may include a virtual distance parameter. Further, the generating of each of the at least one first presentation data and the at least one second presentation data may be based on the virtual distance parameter.

In further embodiments, the at least one first sensor data may include at least one first proximity data corresponding to at least one first external real object in a vicinity of the first vehicle 308. Further, the at least one second sensor data may include at least one second proximity data corresponding to at least one second external real object in a vicinity of the second vehicle 318. Further, the generating of the at least one first presentation data may be based on the at least one second proximity data. Further, the generating of the at least one second presentation data may be based on the at least one first proximity data. In further embodiments, the at least one first external real object may include a first cloud, a first landscape feature, a first man-made structure and a first natural object. Further, the at least one second external real object may include a second cloud, a second landscape feature, a second man-made structure and a second natural object.

In some embodiments, the at least one first sensor data may include at least one first image data corresponding to at least one first external real object in a vicinity of the first vehicle 308. Further, the at least one second sensor data may include at least one second image data corresponding to at least one second external real object in a vicinity of the second vehicle 318. Further, the generating of the at least one first presentation data may be based on the at least one second image data. Further, the generating of the at least one second presentation data may be based on the at least one first image data.

In some embodiments, the communication device 302 may be further configured for transmitting a server authentication data to the first receiver 316. Further, the first receiver 316 may be communicatively coupled to first processor associated with the first presentation device. Further, the first processor may be communicatively coupled to a first memory device configured to store a first authentication data. Further, the first processor may be configured for performing a first server authentication based on the first authentication data and the server authentication data. Further, the first processor may be configured for controlling presentation of the at least one first presentation data on the at least one first presentation device 314 based on the first server authentication. Further, the communication device 302 may be configured for transmitting a server authentication data to the second receiver 326. Further, the second receiver 326 may be communicatively coupled to second processor associated with the second presentation device. Further, the second processor may be communicatively coupled to a second memory device configured to store a second authentication data. Further, the second processor may be configured for performing a second server authentication based on the second authentication data and the server authentication data. Further, the second processor may be configured for controlling presentation of the at least one second presentation data on the at least one second presentation device 324 based on the second server authentication. Further, the communication device 302 may be configured for receiving a first client authentication data from the first transmitter 312. Further, the storage device 306 may be configured for storing the first authentication data. Further, the communication device 302 may be configured for and receiving a second client authentication data from the second transmitter 322. Further, the storage device 306 may be configured for storing the second authentication data. Further, the processing device 304 may be further configured for performing a first client authentication based on the first client authentication data and the first authentication data. Further, the generating of the at least one second presentation data may be further based on the first client authentication. Further, the processing device 304 may be configured for performing a second client authentication based on the second client authentication data and the second authentication data. Further, the generating of the at least one first presentation data may be further based on the second client authentication.

Figure 4:
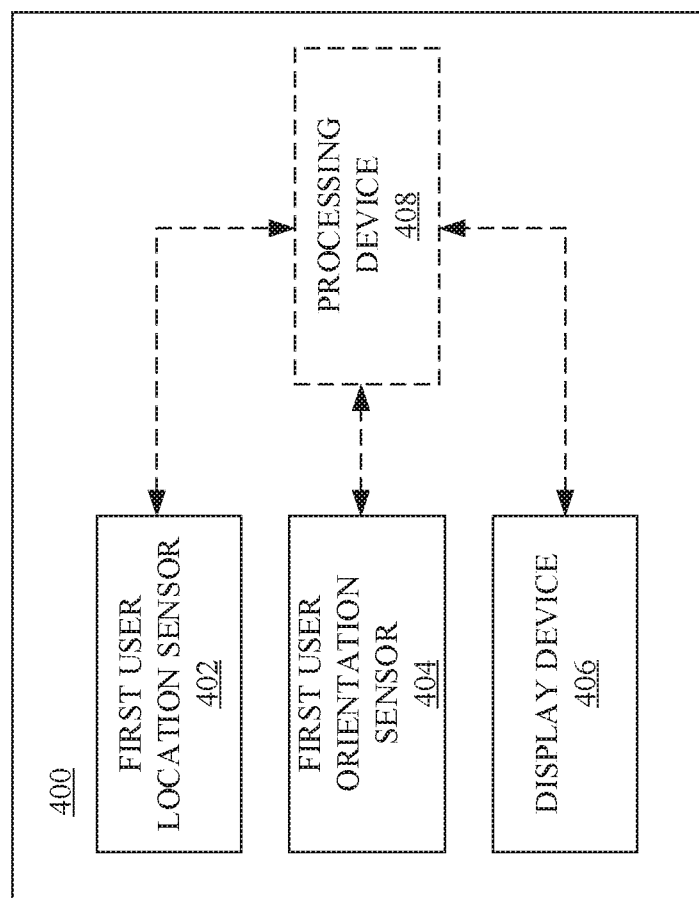
FIG. 4 is a block diagram of a first head mount display for facilitating provisioning of a virtual experience, in accordance with some embodiments

FIG. 4 is a block diagram of a first head mount display 400 for facilitating provisioning of a virtual experience in accordance with some embodiments. The first head mount display 400 includes a first user location sensor 402 of the at least one first sensor configured for sensing the first user location and a first user orientation sensor 404 of the at least one first sensor configured for sensing the first user orientation.

Further, the first head mount display 400 may include a display device 406 to present visuals. The display device may a first see-through display device.

Further, the first head mount display 400 may include a processing device 408 configured to obtain sensor data from the first user location sensor 402 and the first user orientation sensor 404. Further, the processing device 408 may be configured to send visuals to the display device 406.

Figure 5:
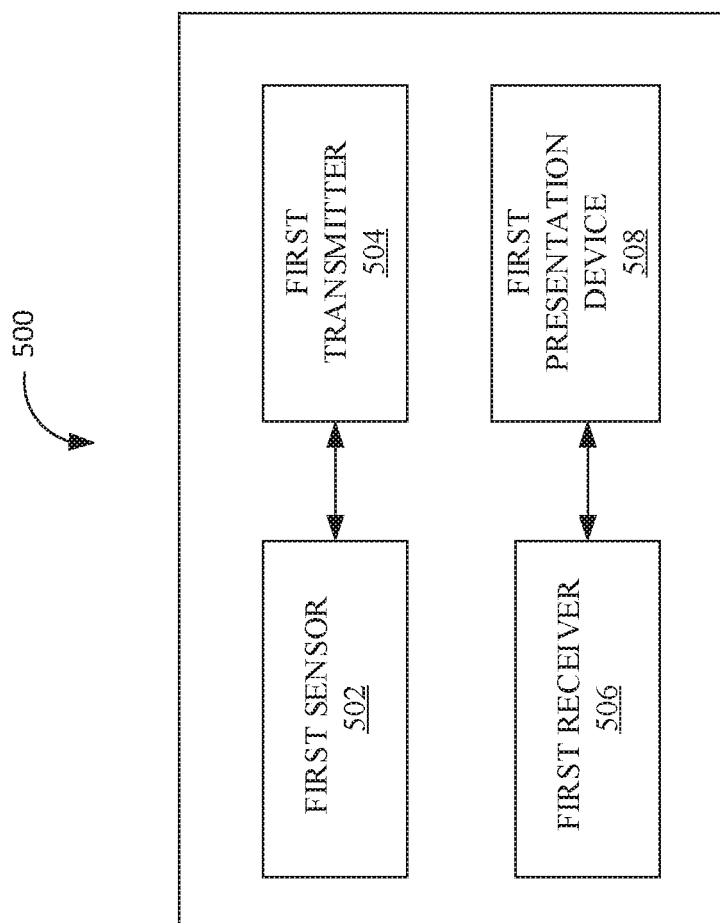
FIG. 5 is a block diagram of an apparatus for facilitating provisioning of a virtual experience, in accordance with some embodiments.

FIG. 5 is a block diagram of an apparatus 500 for facilitating provisioning of a virtual experience in accordance with some embodiments. The apparatus 500 may include at least one first sensor 502 (such as the at least one first sensor 310) configured for sensing at least one first sensor data associated with a first vehicle (such as the first vehicle 308). Further, the apparatus 500 may include a first transmitter 504 (such as the first transmitter 312) configured to be communicatively coupled to the at least first sensor 502. Further, the first transmitter 504 may be further configured for transmitting the at least one first sensor data to a communication device (such as the communication device 302) of a system over a first communication channel.

Further, the apparatus 500 may include a first receiver 506 (such as the first receiver 316) configured for receiving the at least one first presentation data from the communication device over the first communication channel.

Further, the apparatus 500 may include at least one first presentation device 508 (such as the at least one first presentation device 314) configured to be communicatively coupled to the first receiver 506. The at least one first presentation device 508 may be configured for presenting the at last one first presentation data.

Further, the communication device may be further configured for receiving at least one second sensor data corresponding to at least one second sensor (such as the at least one second sensor 320) associated with a second vehicle (such as the second vehicle 318). Further, the at least one second sensor may be communicatively coupled to a second transmitter (such as the second transmitter 322) configured for transmitting the at least one second sensor data over a second communication channel. Further, the system further may include a processing device (such as the processing device 304) communicatively coupled to the communication device. Further, the processing device may be configured for generating the at least one first presentation data based on the at least one second sensor data.

Figure 6:
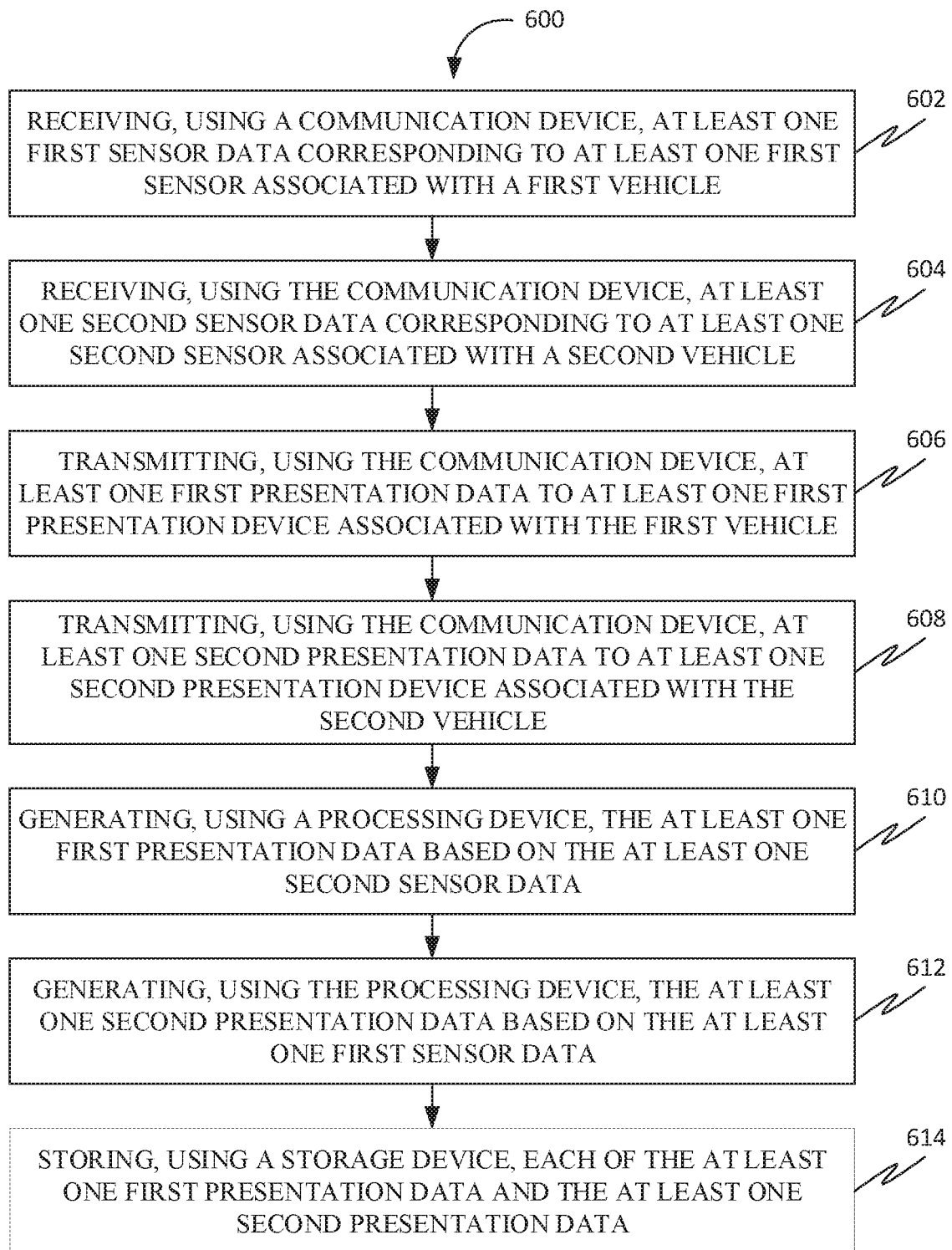
FIG. 6 is a flowchart of a method of facilitating provisioning of a virtual experience, in accordance with some embodiments.

FIG. 6 is a flowchart of a method 600 of facilitating provisioning of a virtual experience in accordance with some embodiments. At 602, the method 600 may include receiving, using a communication device (such as the communication device 302), at least one first sensor data corresponding to at least one first sensor (such as the at least one first sensor 310) associated with a first vehicle (such as the first vehicle 308). Further, the at least one first sensor may be communicatively coupled to a first transmitter (such as the first transmitter 312) configured for transmitting the at least one first sensor data over a first communication channel.

At 604, the method 600 may include receiving, using the communication device, at least one second sensor data corresponding to at least one second sensor (such as the at least one second sensor 320) associated with a second vehicle (such as the second vehicle 318). Further, the at least one second sensor may be communicatively coupled to a second transmitter (such as the second transmitter 322)

configured for transmitting the at least one second sensor data over a second communication channel.

At 606, the method 600 may include transmitting, using the communication device, at least one first presentation data to at least one first presentation device associated with the first vehicle. Further, the at least one first presentation device may include a first receiver (such as the first receiver 316) configured for receiving the at least one first presentation data over the first communication channel. Further, the at least one first presentation device may be configured for presenting the at least one first presentation data.

At 608, the method 600 may include transmitting, using the communication device, at least one second presentation data to at least one second presentation device (such as the at least one second presentation device 324) associated with the second vehicle. Further, the at least one second presentation device may include a second receiver (such as the second receiver 326) configured for receiving the at least one second presentation data over the second communication channel. Further, the at least one second presentation device may be configured for presenting the at least one second presentation data.

At 610, the method 600 may include generating, using a processing device (such as the processing device 304), the at least one first presentation data based on the at least one second sensor data.

At 612, the method 600 may include generating, using the processing device, the at least one second presentation data based on the at least one first sensor data.

At 614, the method 600 may include storing, using a storage device (such as the storage device 306), each of the at least one first presentation data and the at least one second presentation data.

Figure 7:
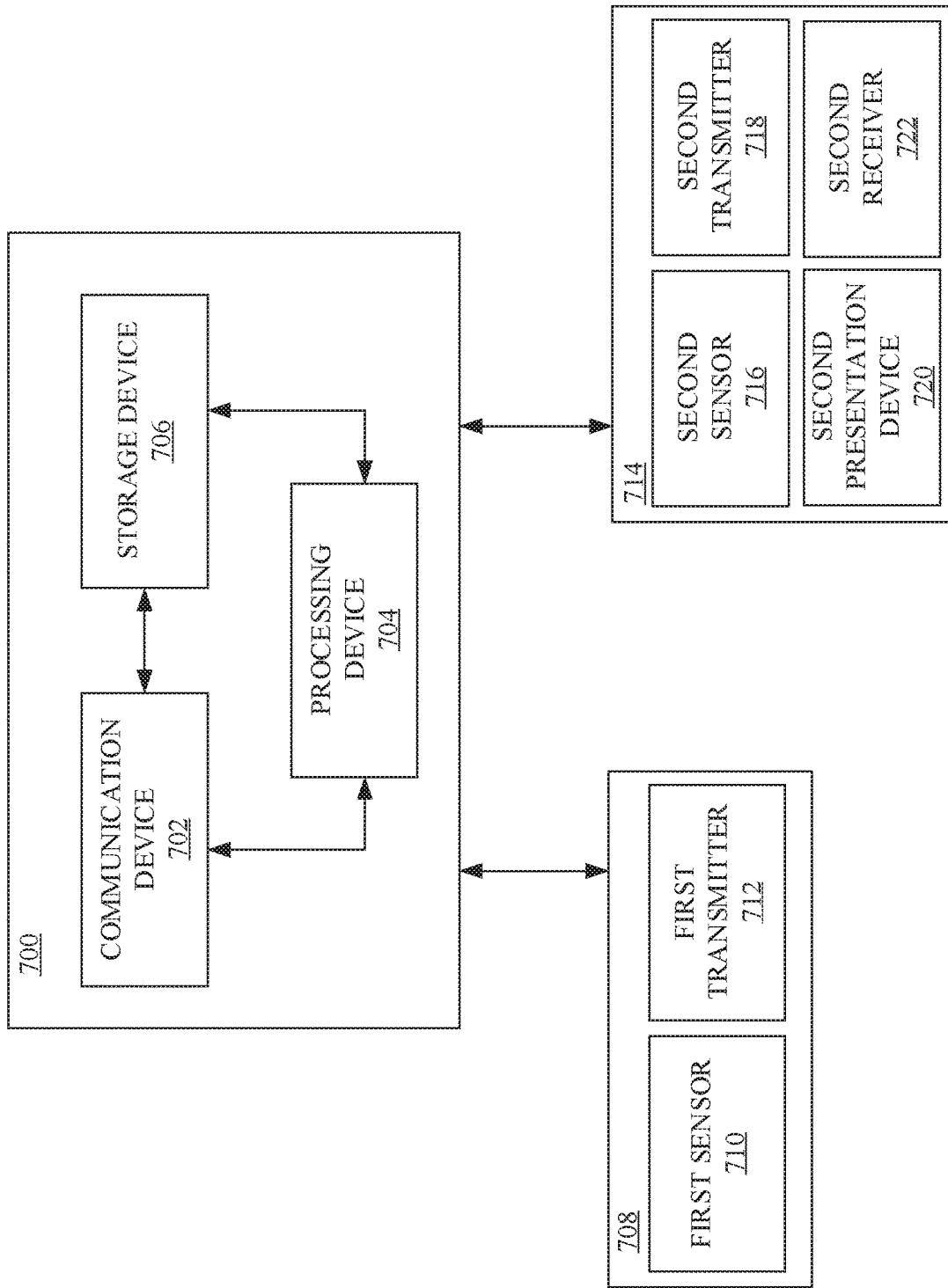
FIG. 7 shows a system for facilitating provisioning of a virtual experience, in accordance with some embodiments.

FIG. 7 shows a system 700 for facilitating provisioning of a virtual experience, in accordance with some embodiments. The system 700 may include a communication device 702 configured for receiving at least one first sensor data corresponding to at least one first sensor 710 associated with a first vehicle 708. Further, the at least one first sensor 710 may be communicatively coupled to a first transmitter 712 configured for transmitting the at least one first sensor data over a first communication channel.

Further, the communication device 702 may be configured for receiving at least one second sensor data corresponding to at least one second sensor 716 associated with a second vehicle 714. Further, the at least one second sensor 716 may include a second location sensor configured to detect a second location associated with the second vehicle 714. Further, the at least one second sensor 716 may be communicatively coupled to a second transmitter 718 configured for transmitting the at least one second sensor data over a second communication channel. Further, in some embodiments, the at least one second sensor 716 may include a second user sensor configured for sensing a second user variable associated with a second user of the second vehicle 714. Further, the second user variable may include a second user location and a second user orientation.

Figure 13:
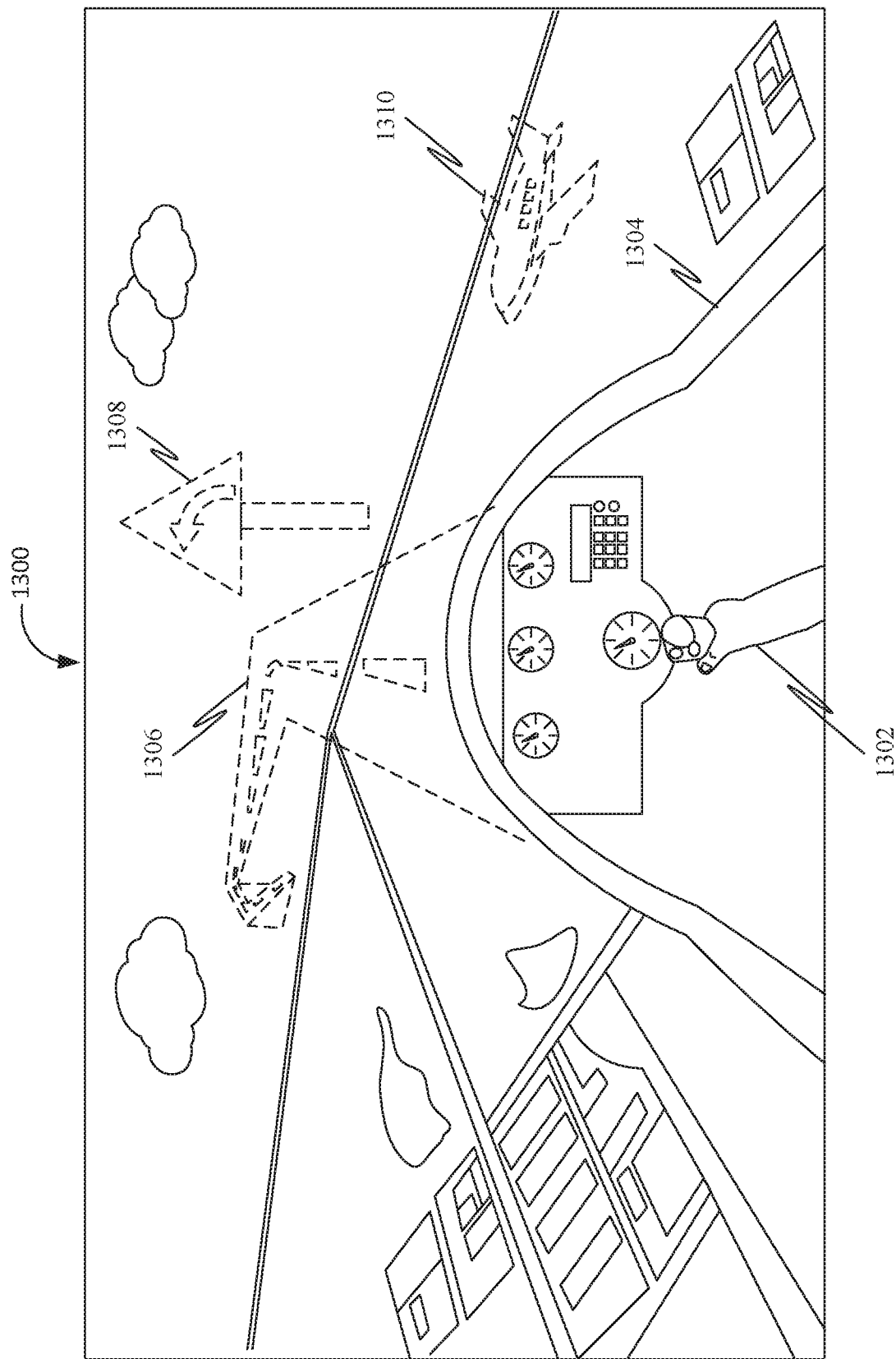
FIG. 13 shows an augmented reality view shown to a real pilot, in accordance with an exemplary embodiment.
Figure 15:
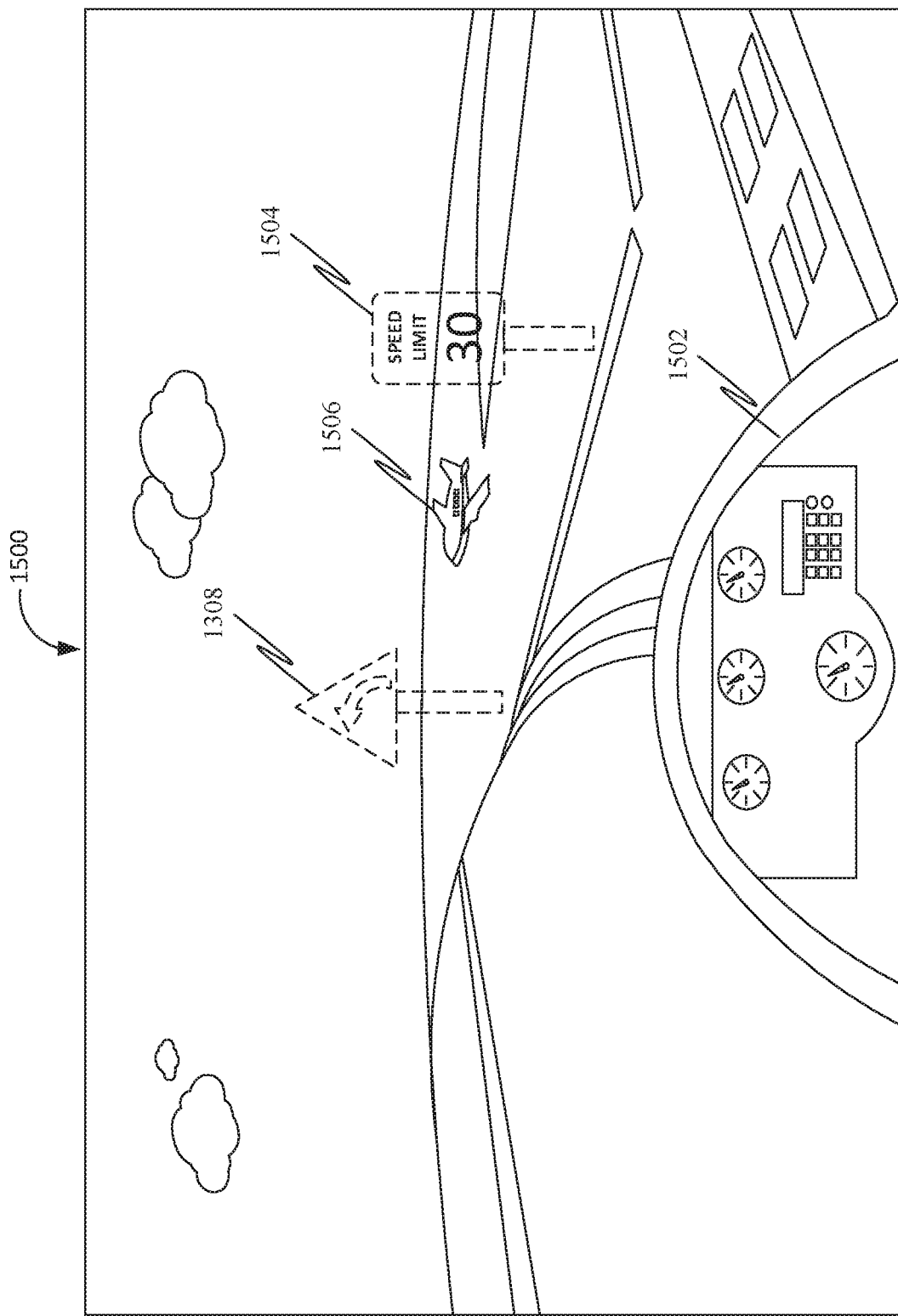
FIG. 15 shows an augmented reality view shown to a real pilot while aircraft is taxiing at an airport, in accordance with an exemplary embodiment.

Further, the communication device 702 configured for transmitting at least one second presentation data to at least one second presentation device 720 associated with the second vehicle 714. Further, the at least one second presentation data may include at least one second virtual object model corresponding to at least one second virtual object. Further, in some embodiments, the at least one second virtual object may include one or more of a navigational marker (such as a navigational marker 1308, and/or a signboard 1504 as shown in FIG. 15) and an air-corridor (such as a skyway 1306 as shown in FIG. 13). Further, the at least one second presentation device 720 may include a second receiver 722 configured for receiving the at least one second presentation data over the second communication channel. Further, the at least one second presentation device 720 may be configured for presenting the at least one second presentation data. Further, in some embodiments, the at least one second presentation device 720 may include a second head mount display. Further, the second head mount display may include a second user location sensor of the at least one second sensor 716 configured for sensing the second user location and a second user orientation sensor of the at least one second sensor 716 configured for sensing the second user orientation. Further, the second head mount display may include a second see-through display device.

Further, the system 700 may include a processing device 704 configured for generating the at least one second presentation data based on the at least one first sensor data and the at least one second sensor data. Further, the generating of the at least one second virtual object model may be independent of the at least one first sensor data. Further, in some embodiments, the processing device 704 may be configured for determining a second airspace class (with reference to FIG. 14) associated with the second vehicle 714 based on the second location including a second altitude associated with the second vehicle 714. Further, the generating of the at least one second virtual object model may be based on the second airspace class.

Further, the system 700 may include a storage device 706 configured for storing the at least one second presentation data. Further, in some embodiments, the storage device 706 may be configured for retrieving the at least one second virtual object model based on the second location associated with the second vehicle 714. Further, in some embodiments, the storage device 706 may be configured for storing a first three-dimensional model corresponding to the first vehicle 708. Further, the generating of the second presentation data may be based on the first three-dimensional model.

Further, in some embodiments, the communication device 702 may be configured for receiving an administrator command from an administrator device. Further, the generating of the at least one second virtual object model may be based on the administrator command.

Further, in some embodiments, the communication device 702 may be configured for transmitting at least one first presentation data to at least one first presentation device (not shown) associated with the first vehicle 708. Further, the at least one first presentation device may include a first receiver configured for receiving the at least one first presentation data over the first communication channel. Further, the at least one first presentation device may be configured for presenting the at least one first presentation data. Further, in some embodiments, the processing device 704 may be configured for generating the at least one first presentation data based on the at least one second sensor data. Further, in some embodiments, the storage device 706 may be configured for storing the at least one first presentation data. Further, in some embodiments, the storage device 706 may be configured for storing a second three-dimensional model corresponding to the second vehicle 714. Further, the generating of the first presentation data may be based on the second three-dimensional model.

Further, in some embodiments, the at least one first presentation data may include at least one first virtual object model corresponding to at least one first virtual object. Further, the generating of the at least one first virtual object model may be independent of the at least one second sensor data. Further, the storage device 706 may be configured for storing the at least one first virtual object model.

Further, in some exemplary embodiment, the communication device 702 may be configured for receiving at least one second sensor data corresponding to at least one second sensor 716 associated with a second vehicle 714. Further, the at least one second sensor 716 may be communicatively coupled to a second transmitter 718 configured for transmitting the at least one second sensor data over a second communication channel. Further, the communication device 702 may be configured for receiving at least one first sensor data corresponding to at least one first sensor 710 associated with a first vehicle 708. Further, the at least one first sensor 710 may include a first location sensor configured to detect a first location associated with the first vehicle 708. Further, the at least one first sensor 710 may be communicatively coupled to a first transmitter 712 configured for transmitting the at least one first sensor data over a first communication channel. Further, in some embodiments, the at least one first sensor 710 may include a first user sensor configured for sensing a first user variable associated with a first user of the first vehicle 708. Further, the first user variable may include a first user location and a first user orientation. Further, the communication device 702 configured for transmitting at least one first presentation data to at least one first presentation device (not shown) associated with the first vehicle 708. Further, the at least one first presentation data may include at least one first virtual object model corresponding to at least one first virtual object. Further, in some embodiments, the at least one first virtual object may include one or more of a navigational marker (such as a navigational marker 1308, and/or a signboard 1504 as shown in FIG. 15) and an air-corridor (such as a skyway 1306 as shown in FIG. 13). Further, the at least one first presentation device may include a first receiver configured for receiving the at least one first presentation data over the first communication channel. Further, the at least one first presentation device may be configured for presenting the at least one first presentation data. Further, in some embodiments, the at least one first presentation device may include a first head mount display. Further, the first head mount display may include a first user location sensor of the at least one first sensor 710 configured for sensing the first user location and a first user orientation sensor of the at least one first sensor 710 configured for sensing the first user orientation. Further, the first head mount display may include a first see-through display device. Further, the processing device 704 may be configured for generating the at least one first presentation data based on the at least one second sensor data and the at least one first sensor data. Further, the generating of the at least one first virtual object model may be independent of the at least one second sensor data. Further, in some embodiments, the processing device 704 may be configured for determining a first airspace class (with reference to FIG. 14) associated with the first vehicle 708 based on the first location including a first altitude associated with the first vehicle 708. Further, the generating of the at least one first virtual object model may be based on the first airspace class. Further, in some embodiments, the storage device 706 may be configured for storing the at least one first presentation data. Further, in some embodiments, the storage device 706 may be configured for retrieving the at least one first virtual object model based on the first location associated with the first vehicle 708. Further, in some embodiments, the storage device 706 may be configured for storing a second three-dimensional model corresponding to the second vehicle 714. Further, the generating of the first presentation data may be based on the second three-dimensional model. Further, in some embodiments, the communication device 702 may be configured for receiving an administrator command from an administrator device. Further, the generating of the at least one first virtual object model may be based on the administrator command. Further, in some embodiments, the communication device 702 may be configured for transmitting at least one second presentation data to at least one second presentation device (such as the second presentation device 720) associated with the second vehicle 714. Further, the at least one second presentation device may include a second receiver (such as the second receiver 722) configured for receiving the at least one second presentation data over the second communication channel. Further, the at least one second presentation device may be configured for presenting the at least one second presentation data. Further, in some embodiments, the processing device 704 may be configured for generating the at least one second presentation data based on the at least one first sensor data. Further, in some embodiments, the storage device 706 may be configured for storing the at least one second presentation data. Further, in some embodiments, the storage device 706 may be configured for storing a first three-dimensional model corresponding to the first vehicle 708. Further, the generating of the second presentation data may be based on the first three-dimensional model. Further, in some embodiments, the at least one second presentation data may include at least one second virtual object model corresponding to at least one second virtual object. Further, the generating of the at least one second virtual object model may be independent of the at least one first sensor data. Further, the storage device 706 may be configured for storing the at least one second virtual object model.

Figure 8:
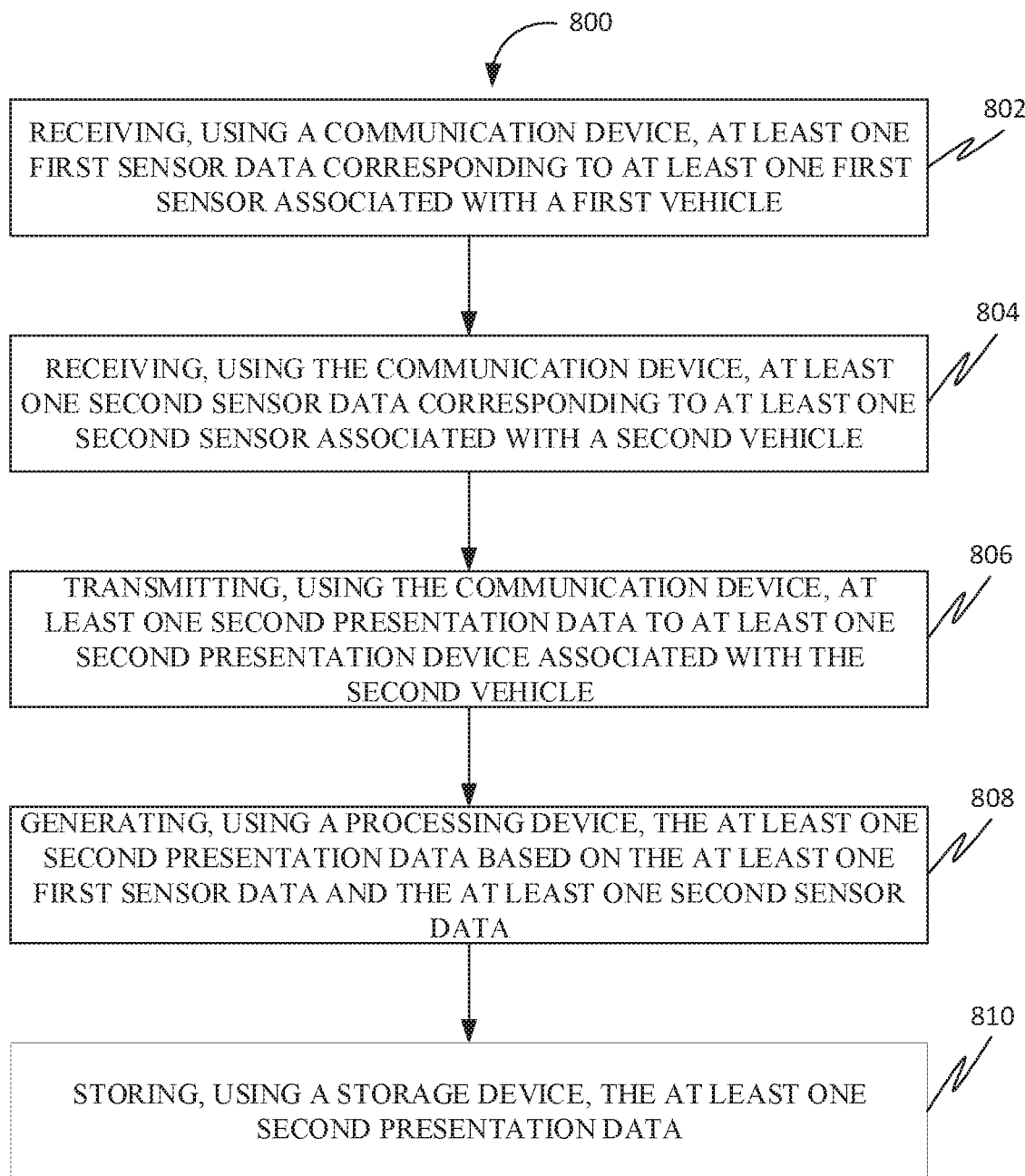
FIG. 8 is a flowchart of a method of facilitating provisioning of a virtual experience, in accordance with some embodiments.

FIG. 8 is a flowchart of a method 800 of facilitating provisioning of a virtual experience, in accordance with some embodiments. Accordingly, at 802, the method 800 may include receiving, using a communication device (such as the communication device 702), at least one first sensor data corresponding to at least one first sensor (such as the at least first sensor 710) associated with a first vehicle (such as the first vehicle 708). Further, the at least one first sensor may be communicatively coupled to a first transmitter (such as the first transmitter 712) configured for transmitting the at least one first sensor data over a first communication channel.

Further, at 804, the method 800 may include receiving, using the communication device, at least one second sensor data corresponding to at least one second sensor (such as the at least one second sensor 716) associated with a second vehicle (such as the second vehicle 714). Further, the at least one second sensor may include a second location sensor configured to detect a second location associated with the second vehicle. Further, the at least one second sensor may be communicatively coupled to a second transmitter (such as the second transmitter 718) configured for transmitting the at least one second sensor data over a second communication channel. Further, in some embodiments, the at least one second sensor may include a second user sensor configured for sensing a second user variable associated with a second user of the second vehicle. Further, the second user variable may include a second user location and a second user orientation.

Further, at 806, the method 800 may include transmitting, using the communication device, at least one second presentation data to at least one second presentation device (such as the at least one second presentation device 720) associated with the second vehicle. Further, the at least one second presentation data may include at least one second virtual object model corresponding to at least one second virtual object. Further, in some embodiments, the at least one second virtual object may include one or more of a navigational marker (such as a navigational marker 1308, and/or a signboard 1504 as shown in FIG. 15) and an air-corridor (such as a skyway 1306 as shown in FIG. 13). Further, the at least one second presentation device may include a second receiver (such as the second receiver 722) configured for receiving the at least one second presentation data over the second communication channel. Further, the at least one second presentation device may be configured for presenting the at least one second presentation data. Further, in some embodiments, the at least one second presentation device may include a second head mount display. Further, the second head mount display may include a second user location sensor of the at least one second sensor configured for sensing the second user location and a second user orientation sensor of the at least one second sensor configured for sensing the second user orientation. Further, the second head mount display may include a second see-through display device.

Further, at 808, the method 800 may include generating, using a processing device (such as the processing device 704), the at least one second presentation data based on the at least one first sensor data and the at least one second sensor data. Further, the generating of the at least one second virtual object model may be independent of the at least one first sensor data.

Further, at 810, the method 800 may include storing, using a storage device (such as the storage device 706), the at least one second presentation data.

Further, in some embodiments, the method 800 may include retrieving, using the storage device, the at least one second virtual object model based on the second location associated with the second vehicle.

Further, in some embodiments, the method 800 may include determining, using the processing device, a second airspace class (with reference to FIG. 14) associated with the second vehicle based on the second location including a second altitude associated with the second vehicle. Further, the generating of the at least one second virtual object model may be based on the second airspace class.

Further, in some embodiments, the method 800 may include storing, using the storage device, a first three-dimensional model corresponding to the first vehicle. Further, the generating of the second presentation data may be based on the first three-dimensional model.

Further, in some embodiments, the method 800 may include receiving, using the communication device, an administrator command from an administrator device. Further, the generating of the at least one second virtual object model may be based on the administrator command.

Further, in some exemplary embodiments, the method 800 may include receiving, using a communication device (such as the communication device 702), at least one second sensor data corresponding to at least one second sensor (such as the at least second sensor 716) associated with a second vehicle (such as the second vehicle 714). Further, the at least one second sensor may be communicatively coupled to a second transmitter (such as the second transmitter 718) configured for transmitting the at least one second sensor data over a second communication channel. Further, the method 800 may include receiving, using the communication device, at least one first sensor data corresponding to at least one first sensor (such as the at least one first sensor 710) associated with a first vehicle (such as the first vehicle 708).

Further, the at least one first sensor may include a first location sensor configured to detect a first location associated with the first vehicle. Further, the at least one first sensor may be communicatively coupled to a first transmitter (such as the first transmitter 712) configured for transmitting the at least one first sensor data over a first communication channel. Further, in some embodiments, the at least one first sensor may include a first user sensor configured for sensing a first user variable associated with a first user of the first vehicle. Further, the first user variable may include a first user location and a first user orientation. Further, the method 800 may include transmitting, using the communication device, at least one first presentation data to at least one first presentation device associated with the first vehicle 708. Further, the at least one first presentation data may include at least one first virtual object model corresponding to at least one first virtual object. Further, in some embodiments, the at least one first virtual object may include one or more of a navigational marker (such as a navigational marker 1308, and/or a signboard 1504 as shown in FIG. 15) and an air-corridor (such as a skyway 1306 as shown in FIG. 13). Further, the at least one first presentation device may include a first receiver configured for receiving the at least one first presentation data over the first communication channel. Further, the at least one first presentation device may be configured for presenting the at least one first presentation data. Further, in some embodiments, the at least one first presentation device may include a first head mount display. Further, the first head mount display may include a first user location sensor of the at least one first sensor configured for sensing the first user location and a first user orientation sensor of the at least one first sensor configured for sensing the first user orientation. Further, the first head mount display may include a first see-through display device. Further, the method 800 may include generating, using a processing device (such as the processing device 704), the at least one first presentation data based on the at least one second sensor data and the at least one first sensor data. Further, the generating of the at least one first virtual object model may be independent of the at least one second sensor data. Further, the method 800 may include storing, using a storage device (such as the storage device 706), the at least one first presentation data. Further, in some embodiments, the method 800 may include retrieving, using the storage device, the at least one first virtual object model based on the first location associated with the first vehicle 708. Further, in some embodiments, the method 800 may include determining, using the processing device, a first airspace class (with reference to FIG. 14) associated with the first vehicle 708 based on the first location including a first altitude associated with the first vehicle. Further, the generating of the at least one first virtual object model may be based on the first airspace class. Further, in some embodiments, the method 800 may include storing, using the storage device, a second three-dimensional model corresponding to the second vehicle 714. Further, the generating of the first presentation data may be based on the second three-dimensional model. Further, in some embodiments, the method 800 may include receiving, using the communication device, an administrator command from an administrator device. Further, the generating of the at least one first virtual object model may be based on the administrator command.

Figure 9:
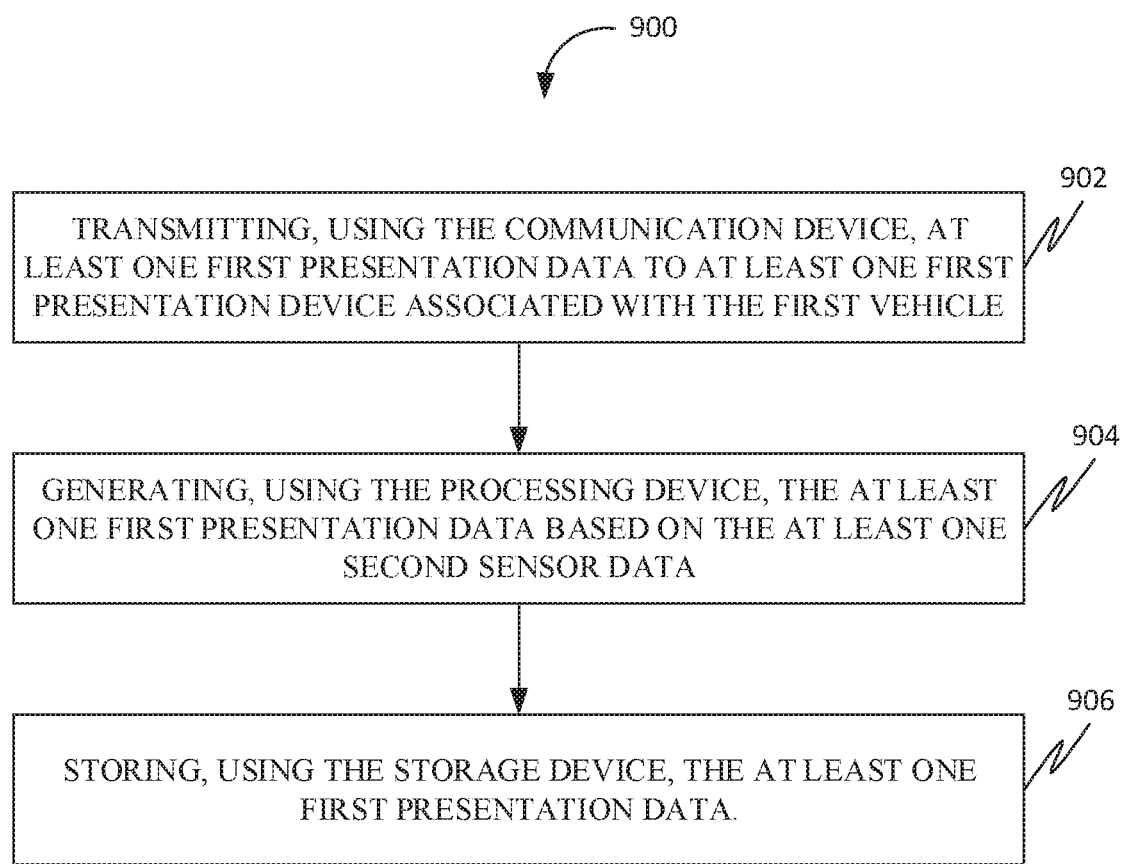
FIG. 9 is a flowchart of a method 900 to facilitate providing at least one first presentation data.

FIG. 9 is a flowchart of a method 900 to facilitate providing at least one first presentation data. Accordingly, at 902, the method 900 may include transmitting, using the communication device, at least one first presentation data to at least one first presentation device associated with the first vehicle. Further, the at least one first presentation device may include a first receiver configured for receiving the at least one first presentation data over the first communication channel. Further, the at least one first presentation device may be configured for presenting the at least one first presentation data.

Further, at 904, the method 900 may include generating, using the processing device, the at least one first presentation data based on the at least one second sensor data.

Further, at 906, the method 900 may include storing, using the storage device, the at least one first presentation data.

Further, in some embodiments, the method 900 may include storing, using the storage device, a second three-dimensional model corresponding to the second vehicle. Further, the generating of the first presentation data may be based on the second three-dimensional model.

Further, in some embodiments, the at least one first presentation data may include at least one first virtual object model corresponding to at least one first virtual object. Further, the generating of the at least one first virtual object model may be independent of the at least one second sensor data. Further, the method 900 may include storing, using the storage device, the at least one first virtual object model.

Further, in some exemplary embodiment, the method 900 may facilitate providing at least one second presentation data. Accordingly, the method 900 may include transmitting, using the communication device, at least one second presentation data to at least one second presentation device associated with the second vehicle. Further, the at least one second presentation device may include a second receiver configured for receiving the at least one second presentation data over the second communication channel. Further, the at least one second presentation device may be configured for presenting the at least one second presentation data. Further, the method 900 may include generating, using the processing device, the at least one second presentation data based on the at least one first sensor data. Further, the method 900 may include storing, using the storage device, the at least one second presentation data. Further, in some embodiments, the method 900 may include storing, using the storage device, a first three-dimensional model corresponding to the first vehicle. Further, the generating of the second presentation data may be based on the first three-dimensional model. Further, in some embodiments, the at least one second presentation data may include at least one second virtual object model corresponding to at least one second virtual object. Further, the generating of the at least one second virtual object model may be independent of the at least one first sensor data. Further, the method 900 may include storing, using the storage device, the at least one second virtual object model.

Figure 10:
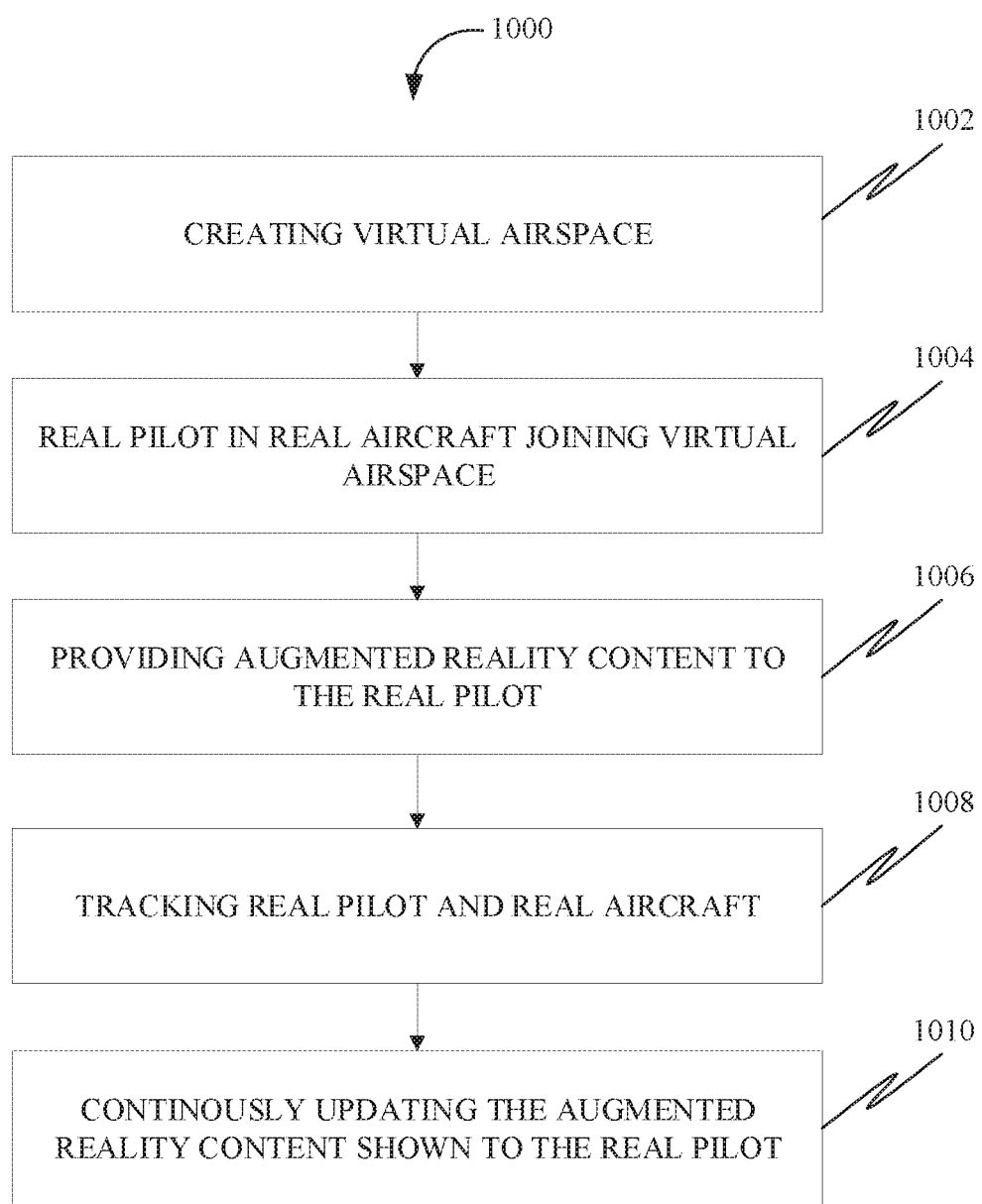
FIG. 10 shows a method to allow real pilots in real aircraft using augmented and virtual reality to meet in a virtual piece of airspace, in accordance with some embodiments.

FIG. 10 shows a method 1000 to allow real pilots in real aircraft using augmented and virtual reality to meet in a virtual airspace, in accordance with some embodiments. Accordingly, at 1002, the method 1000 may include creating the virtual airspace in an augmented and virtual reality environment. The virtual airspace may be a three-dimensional space in which one or more aircraft may meet.

Further, at 1004, the method 1000 may include a real pilot in a real aircraft joining the virtual airspace via their augmented and virtual reality equipment. The real aircraft may be flying in the real world. Accordingly, an image of the real aircraft may be included in the virtual airspace. Therefore, this provides a live simulation involving real people operating real systems.

In some embodiments, the virtual airspace may include virtual aircraft, which may be flown by real people in simulated systems, on the ground.

In some embodiments, the virtual airspace may further include constructed aircraft (and/or targets). The constructed aircraft may be generated and controlled using computer graphics and processing systems.

Further, at 1006, the method 1000 may include providing augmented and virtual reality content to the real pilot via their augmented and virtual reality equipment. In some embodiments, the method may include providing augmented and virtual reality content to the real people (on the ground) flying virtual aircraft in the virtual airspace.

Further, at 1008, the method 1000 may include tracking the real pilot and the real aircraft. This may include tracking the position and orientation of the pilot's head within the cockpit of the aircraft using the one or more internal sensors. Further, this may include tracking the operational state (e.g. location, speed, direction of travel, etc.) of the aircraft in the virtual airspace using the one or more external sensors.

Moreover, at 1010, the method 1000 may include continuously updating the augmented and virtual reality content shown to the real pilot flying the real aircraft based on the tracking of the real pilot and the real aircraft.

In some embodiments, the augmented and virtual reality content shown to the real pilot flying the real aircraft may be updated based on the operational state (e.g. location, speed, direction of travel, etc.) of the virtual aircraft flown by the real people (on the ground) and the operational state (e.g. location, speed, direction of travel, etc.) of the constructed aircraft.

In some embodiments, the method 1000 may include continuously updating the augmented and virtual reality content shown to the real pilot (on the ground) flying the virtual aircraft based on the tracking the real pilot and the real aircraft, the operational state (e.g. location, speed, direction of travel, etc.) of the virtual aircraft flown by the real people (on the ground) and the operational state (e.g. location, speed, direction of travel, etc.) of the constructed aircraft.

Figure 11:
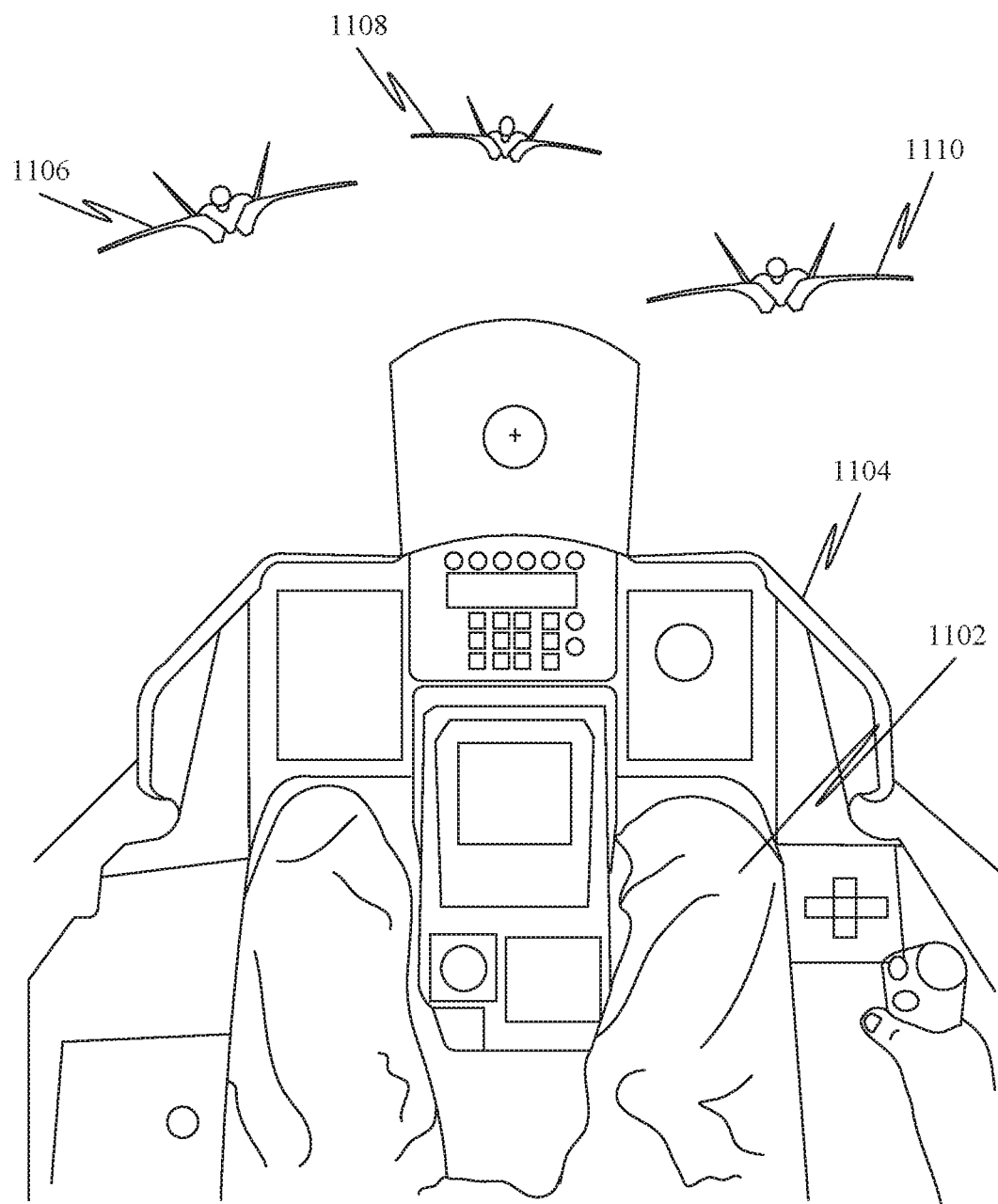
FIG. 11 shows an augmented reality view shown to a real pilot, in accordance with an exemplary embodiment.

FIG. 11 shows the augmented and virtual reality content shown to a real pilot (such as pilot 1102) flying a real aircraft (such as aircraft 1104), in accordance with an exemplary embodiment. The augmented and virtual reality content may include one or more live aircraft 1106 (representing real pilots flying real aircraft), one or more virtual aircraft 1108 (representing real people on the ground, flying virtual aircraft) and one or more constructed aircraft 1110 (representing aircraft generated and controlled using computer graphics and processing systems). Accordingly, the pilot 1102 wearing an augmented and virtual reality display device may look out the cockpit window to see enemy aircraft (such as live aircraft 1106, virtual aircraft 1108, and/or constructed aircraft 1110) in extremely high fidelity. Further, the pilot 1102 may then practice offensive/defensive air-to-air maneuvers against the digital enemy while continuing to fly his own aircraft 1104.

Figure 12:
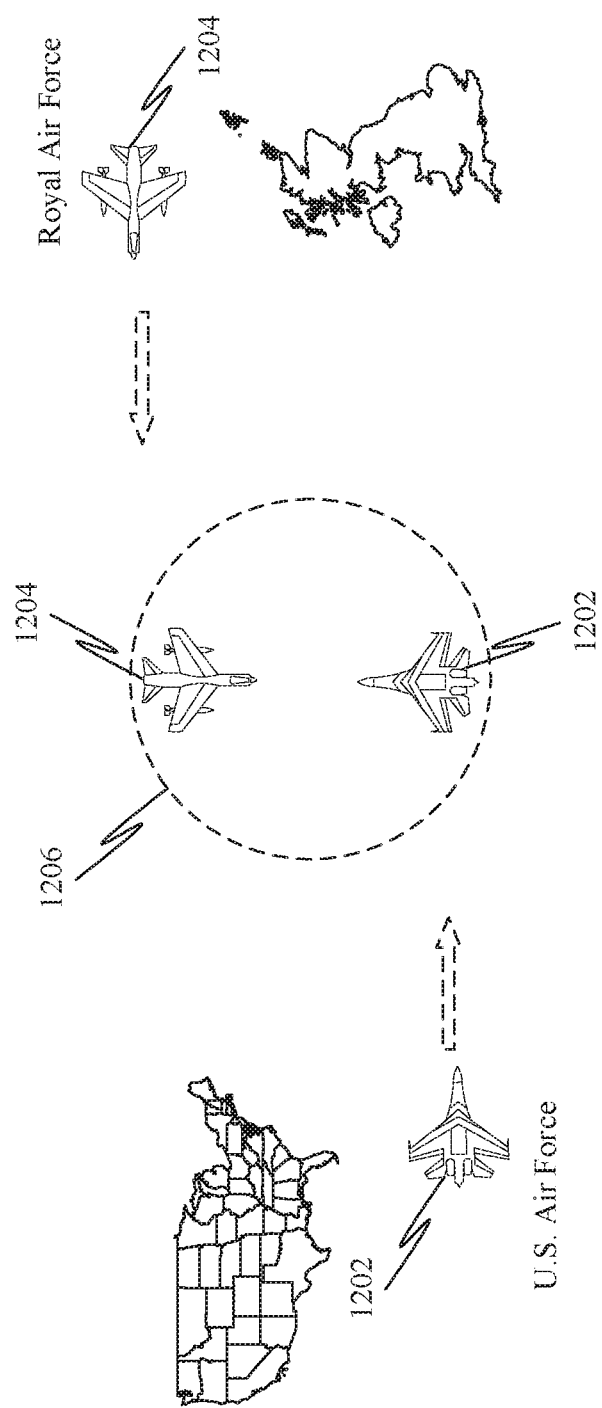
FIG. 12 shows two real aircraft in a virtual airspace, in accordance with an exemplary embodiment.

FIG. 12 shows two real aircraft (such as aircraft 1202, and aircraft 1204) in a virtual airspace 1206, in accordance with an exemplary embodiment. The two real aircraft (such as aircraft 1202, and aircraft 1204) may be flown by two real pilots (a pilot A and a pilot B). Further, both the pilots may be capable of using the disclosed system (ATARI) to view the augmented and virtual reality content. Further, the pilot A may be able to see the pilot B via their augmented and virtual reality equipment. Further, the pilot A may be able to see one or more virtual aircraft (not shown in FIG. 12) which may be enemy aircraft or friendly aircraft.

In some embodiments, the pilot A and the pilot B may be enemies and may engage in combat against each other.

In some embodiments, the pilot A and the pilot B may be friendly and may cooperate in combat against enemy aircraft. High-speed communication between the two aircraft may be employed to allow for effective cooperation.

In some embodiments, the two aircraft 1202-1204 may not fly together in the real world. As shown in FIG. 12, one aircraft (such as aircraft 1202) may take off in the USA and the other aircraft (such as aircraft 1204) may take off in the UK. Therefore, the two aircraft 1202-1204 fly physically in the air in different geographical location, but they may share the same virtual airspace (6D airspace) provided by the disclosed system (ATARI).

Accordingly, the pilot A may fight against the pilot B in the common virtual airspace 1206. Therefore, each pilot may see other pilot's virtual image in their augmented and virtual reality equipment.

Further, the pilot A and the pilot B may fight together against enemies. Again, both pilots may see each other's virtual images. However, in this case, they may collaborate, and not fight against each other.

FIG. 13 shows an augmented reality view 1300 shown to a real pilot (such as pilot 1302), in accordance with an exemplary embodiment. Further, the augmented reality view 1300 may be generated and displayed over a virtual reality display. For example, the virtual reality display may include a head-mounted display (HMD), eyeglasses, Head-Up Display (HUD), smart contact lenses, a virtual retinal display, an eye tap, a Primary Flight Display (PFD) and a cockpit glass etc. Further, the augmented reality view 1300 may assist a pilot 1302 in flying a civilian aircraft 1304.

As shown in FIG. 13, the augmented reality view 1300 includes a road drawn in the sky (such as a skyway 1306) indicating a path that the civilian aircraft 1304 may take in order to land at an airport. Further, the augmented reality view 1300 may include a navigation marker 1308 indicating to the pilot 1302 that the civilian aircraft 1304 should take a left turn. The navigation marker 1308 may assist the pilot 1302 in navigating towards a landing strip to land the civilian aircraft 1304.

Therefore, the augmented reality view 1300 may provide pilots with a similar view as seen by public transport drivers (e.g. taxi or bus) on the ground. The pilots (such as the pilot 1302) may see roads (such as the skyway 1306) that the pilot 1302 need to drive on. Further, the pilot 1302, in an instance, may see signs just like a taxi driver who may just look out of a window and see road signs.

Further, the augmented reality view 1300 may include (but not limited to) one or more of skyways (such the skyway 1306), navigation markers (such as the navigation marker 1308), virtual tunnels, weather information, an air corridor, speed, signboards for precautions, airspace class, one or more parameters shown on a conventional horizontal situation indicator (HSI) etc. The skyways may indicate a path that an aircraft (such as the civilian aircraft 1304) should take. The skyways may appear similar to roads on the ground. The navigation markers may be similar to regulatory road signs used on the roads on the ground. Further, the navigation markers may instruct pilots (such as the pilot 1302) on what they must or should do (or not do) under a given set of circumstances. Further, the navigation markers may be used to reinforce air-traffic laws, regulations or requirements which apply either at all times or at specified times or places upon a flight path. For example, the navigation markers may include one or more of a left curve ahead sign, a right curve ahead sign, a keep left sign, and a keep to right sign. Further, the virtual tunnels may appear similar to tunnels on roads on the ground. The pilot 1302 may be required to fly the aircraft through the virtual tunnel. Further, the weather information may include real-time weather data that affects flying conditions. For example, the weather information may include information related to one or more of wind speed, gust, and direction; variable wind direction; visibility, and variable visibility; temperature; precipitation; and cloud cover. Further, the air corridor may indicate an air route along which the aircraft is allowed to fly, especially when the aircraft is over a foreign country. Further, the augmented reality view 1300 may include speed information. The speed information may include one or more of a current speed, a ground speed, and a recommended speed. The signboards for precautions may be related to warnings shown to the pilot 1302. The one or more parameters shown on a conventional horizontal situation indicator (HSI) include NAV warning flag, lubber line, compass warning flag, course select pointer, TO/FROM indicator, glideslope deviation scale, heading select knob, compass card, course deviation scale, course select knob, course deviation bar (CDI), symbolic aircraft, dual glideslope pointers, and heading select bug.

Further, in some embodiments, information such as altitude, attitude, airspeed, the rate of climb, heading, autopilot and auto-throttle engagement status, flight director modes and approach status etc. that may be displayed on a conventional primary flight display may also be displayed in the augmented reality view 1300.

Further, in some embodiments, the augmented reality view 1300 may include a one or more of other vehicles (such as another airplane 1310). Further, the one or more other vehicles, in an instance, may include one or more live vehicles (such as representing real pilots flying real aircraft), one or more virtual vehicles (such as representing real people on the ground, flying virtual aircraft), and one or more constructed vehicles (such as representing aircraft generated and controlled using computer graphics and processing systems).

Figure 14:
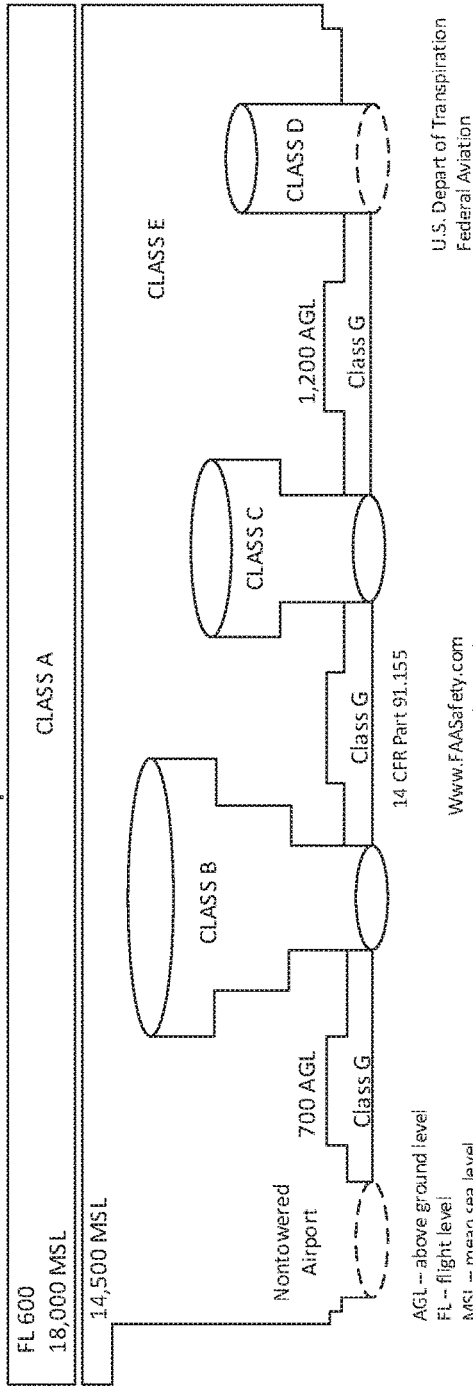
FIG. 14 is a chart related to the United States airspace system's classification scheme.

Further, the augmented reality view 1300 may include an airspace. FIG. 14 is a chart related to the United States airspace system's classification scheme. Specifically, FIG. 14 illustrates various parameters related to one or more classes defined in the United States airspace system's classification scheme. The classification scheme is intended to maximize pilot flexibility within acceptable levels of risk appropriate to the type of operation and traffic density within that class of airspace—in particular, to provide separation and active control in areas of dense or high-speed flight operations. The Albert Roper (1919-10-13 The Paris Convention) implementation of International Civil Aviation Organization (ICAO) airspace classes defines classes A through G (with the exception of class F which is not used in the United States).

For an instance, a computing device (such as the computing device 1600) may analyze one or more parameters such as altitude, Visual Flight Rules (VFR), Instrument Flight Rules (IFR), VFR cloud clearance, and VFR minimum visibility etc. to determine an applicable airspace class. Further, the determined airspace class may be displayed on the virtual reality display. Further, the applicable airspace class may be determined using a location tracker such as a GPS and may be displayed as a notification on the virtual reality display.

Further, a special use airspace class may be determined. The special use airspace class may include alert areas, warning areas, restricted areas, prohibited airspace, military operation area, national security area, controlled firing areas etc. For an instance, if an aircraft (such as the civilian aircraft 1304) enters a prohibited area by mistake, then a notification may be displayed in the augmented reality view 1300. Accordingly, the pilot 1302 may reroute the aircraft towards a permitted airspace.

Further, the augmented reality view 1300 may include one or more live aircraft (representing real pilots flying real aircraft), one or more virtual aircraft (representing real people on the ground, flying virtual aircraft) and one or more constructed aircraft (representing aircraft generated and controlled using computer graphics and processing systems). Further, the augmented reality view 1300 shown to a pilot (such as the pilot 1302) in a first aircraft (such as the civilian aircraft 1304) may be modified based on sensor data received from another aircraft (such as another airplane 1310). The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

FIG. 15 shows an augmented reality view 1500 shown to a real pilot while a civilian aircraft 1502 is taxiing at an airport, in accordance with an exemplary embodiment. The augmented reality view 1500 may include one or more navigational markers (such as the navigation marker 1308) and signboards (such as a signboard 1504) that assist a pilot to taxi the civilian aircraft 1502 at the airport. The navigational markers may indicate the direction of movement. The signboards may indicate the speed limits.

The augmented reality view 1500 may help the pilot to taxi the civilian aircraft 1502 towards a parking location after landing. Further, augmented reality view 1500 may help the pilot to taxi the civilian aircraft 1502 towards a runway for taking-off. Therefore, a ground crew may no longer be required to instruct the pilot while taxiing the civilian aircraft 1502 at the airport.

Further, the augmented reality view 1500 may include one or more live aircraft (such as a live aircraft 1506) at the airport (representing real pilots in real aircraft), one or more virtual aircraft at the airport (representing real people on the ground, controlling a virtual aircraft) and one or more constructed aircraft at the airport (representing aircraft generated and controlled using computer graphics and processing systems). Further, the augmented reality view 1500 shown to a pilot in a first aircraft may be modified based on sensor data received from another aircraft. The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

Figure 16:
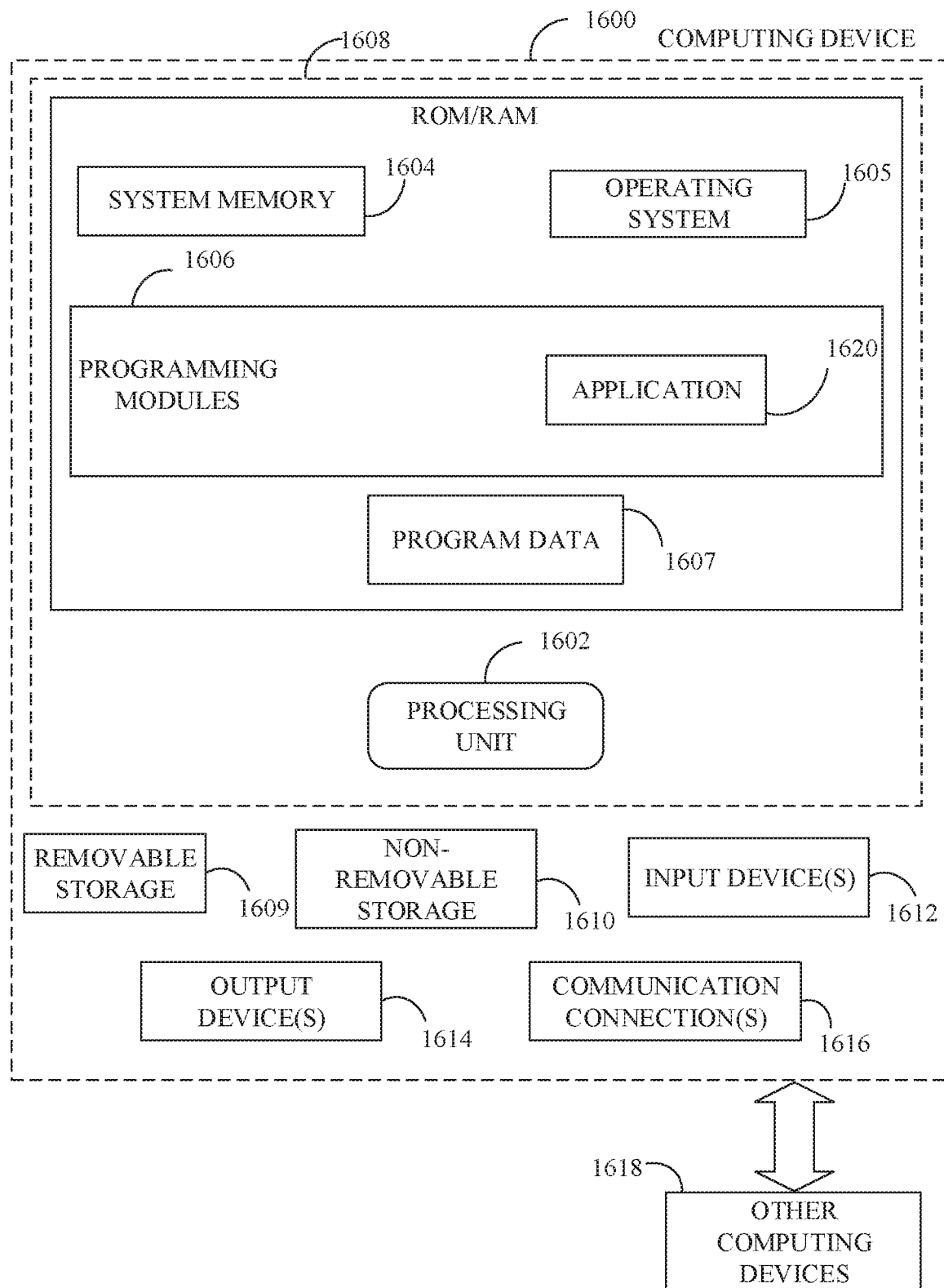
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random-access memory (RAM)), non-volatile (e.g. read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include virtualization module, image-processing module, machine learning module and/or tracking module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and nonvolatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 (e.g., application 1620 such as a media player) may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include sound encoding/decoding applications, machine learning application, acoustic classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

We claim:

1. A system for facilitating a virtual experience, the system comprising:
   a communication device configured for:
      receiving at least one first sensor data corresponding to at least one first sensor associated with a first vehicle wherein the first sensor data comprises a first location in a first airspace associated with the first vehicle;
      receiving at least one second sensor data corresponding to at least one second sensor associated with a second vehicle, wherein the second sensor data comprises a second location in a second airspace associated with the second vehicle; and
      transmitting at least one second presentation data to at least one second presentation device associated with the second vehicle;
   a processing device configured for generating presentation data based, at least in part, on the at least one first sensor data and the at least one second sensor data, wherein the presentation data corresponds to a virtual airspace onto which is mapped the first location of the first vehicle and the second location of the second vehicle; and
   a storage device configured for storing the at least one second presentation data;

wherein the at least one second presentation device comprises a second head mount display the second head mount display comprising a second user location sensor of the at least one second sensor configured for sensing the second user location and a second user orientation sensor of the at least one second sensor configured for sensing the second user orientation.

2. The system of claim 1, wherein the second presentation data defines at least one second virtual object selected from the group consisting of at least one of a navigational marker and an air-corridor.

3. The system of claim 1, wherein the processing device is further configured for determining a second airspace class associated with the second vehicle based on the second location comprising a second altitude associated with the second vehicle, wherein the generating of the at least one second presentation data is further based on the second airspace class.

4. The system of claim 1, wherein the communication device is further configured for transmitting at least one first presentation data to at least one first presentation device associated with the first vehicle, wherein the processing device is further configured for generating the at least one first presentation data based on the at least one second sensor data, wherein the storage device is further configured for storing the at least one first presentation data.

5. The system of claim 4, wherein the at least one first presentation data comprises at least one first virtual object model corresponding to at least one first virtual object.

6. The system of claim 1, wherein the at least one second sensor comprises a second user sensor configured for sensing a second user variable associated with a second user of the second vehicle, wherein the second user variable comprises a second user location and a second user orientation, wherein the second head mount display comprises a second see-through display device.

7. The system of claim 1, wherein the communication device is further configured for receiving an administrator command from an administrator device, wherein the generating of the at least one second presentation data is based further on the administrator command.

8. A method of facilitating provisioning of a virtual experience, the method comprising:
    receiving, using a communication device, at least one first sensor data corresponding to at least one first sensor associated with a first vehicle wherein the first sensor data comprises a first location in a first airspace associated with the first vehicle;
    receiving, using the communication device, at least one second sensor data corresponding to at least one second sensor associated with a second vehicle, wherein the second sensor data comprises a second location in a second airspace associated with the second vehicle;
    transmitting, using the communication device, at least one second presentation data to at least one second presentation device associated with the second vehicle;
    generating, using a processing device, the at least one second presentation data based, at least in part, on the at least one first sensor data and the at least one second sensor data, wherein the presentation data corresponds to a virtual airspace onto which is mapped the first location of the first vehicle and the second location of the second vehicle; and
    storing, using a storage device, the at least one second presentation data;
    wherein the at least one second presentation device comprises a second head mount display, wherein the second head mount display comprises a second user location sensor of the at least one second sensor configured for sensing the second user location and a second user orientation sensor of the at least one second sensor configured for sensing the second user orientation.

9. The method of claim 8, wherein the second presentation data defines at least one second virtual object selected from the group consisting of at least one of a navigational marker and an air-corridor.

10. The method of claim 8 further comprising determining, using the communication device, a second airspace class associated with the second vehicle based on the second location comprising a second altitude associated with the second vehicle, wherein the generating of the at least one second presentation data is further based on the second airspace class.

11. The method of claim 8 further comprising:
    transmitting, using the communication device, at least one first presentation data to at least one first presentation device associated with the first vehicle;
    generating, using the processing device, the at least one first presentation data based on the at least one second sensor data; and
    storing, using the storage device, the at least one first presentation data.

12. The method of claim 11, wherein the at least one first presentation data comprises at least one first virtual object model corresponding to at least one first virtual object.

13. The method of claim 8, wherein the at least one second sensor comprises a second user sensor configured for sensing a second user variable associated with a second user of the second vehicle, wherein the second user variable comprises a second user location and a second user orientation, wherein the second head mount display comprises a second see-through display device.

14. The method of claim 8 further comprising receiving, using the communication device, an administrator command from an administrator device, wherein the generating of the at least one second presentation data is based further on the administrator command.

* * * * *